United States Patent
Matsumoto

(10) Patent No.: US 9,952,966 B2
(45) Date of Patent: Apr. 24, 2018

(54) CONTROL APPARATUS AND CONTROL METHOD THEREFOR

(71) Applicant: CANON KABUSHIKI KAISHA, Tokyo (JP)

(72) Inventor: Akihiro Matsumoto, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 91 days.

(21) Appl. No.: 14/087,760

(22) Filed: Nov. 22, 2013

(65) Prior Publication Data

US 2014/0082314 A1 Mar. 20, 2014

Related U.S. Application Data

(63) Continuation of application No. 12/762,652, filed on Apr. 19, 2010, now abandoned.

(30) Foreign Application Priority Data

Apr. 23, 2009 (JP) .................................. 2009-105411

(51) Int. Cl.
*G06F 12/02* (2006.01)
*G06F 21/85* (2013.01)

(52) U.S. Cl.
CPC .............. *G06F 12/02* (2013.01); *G06F 21/85* (2013.01); *G06F 2221/2143* (2013.01); *H04N 2201/0094* (2013.01); *H04N 2201/218* (2013.01)

(58) Field of Classification Search
CPC ... G06F 21/85; G06F 2221/2143; G06F 12/02
See application file for complete search history.

(56) References Cited

U.S. PATENT DOCUMENTS

2004/0114173 A1* 6/2004 Bunker ................. G06F 9/4403
358/1.14
2004/0188710 A1* 9/2004 Koren et al. ................... 257/197

* cited by examiner

*Primary Examiner* — Michael Alsip
(74) *Attorney, Agent, or Firm* — Canon U.S.A., Inc. IP Division

(57) ABSTRACT

When a controller receives a new command from a main controller during overwrite-deletion processing for a specific storage apparatus, the received command is stored at least until completion of the overwrite-deletion processing when the received command is a command to the specific storage apparatus. Alternatively, progression of overwrite-deletion process is stored and priority processing of the received command is executed. On the other hand, when the received command is not a command to the specific storage apparatus, processing for the command is executed.

16 Claims, 15 Drawing Sheets

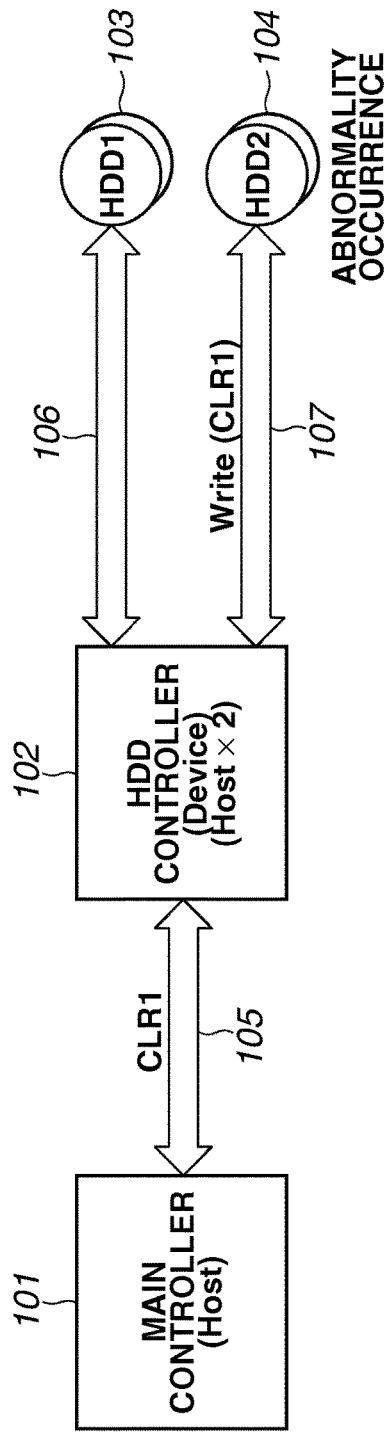
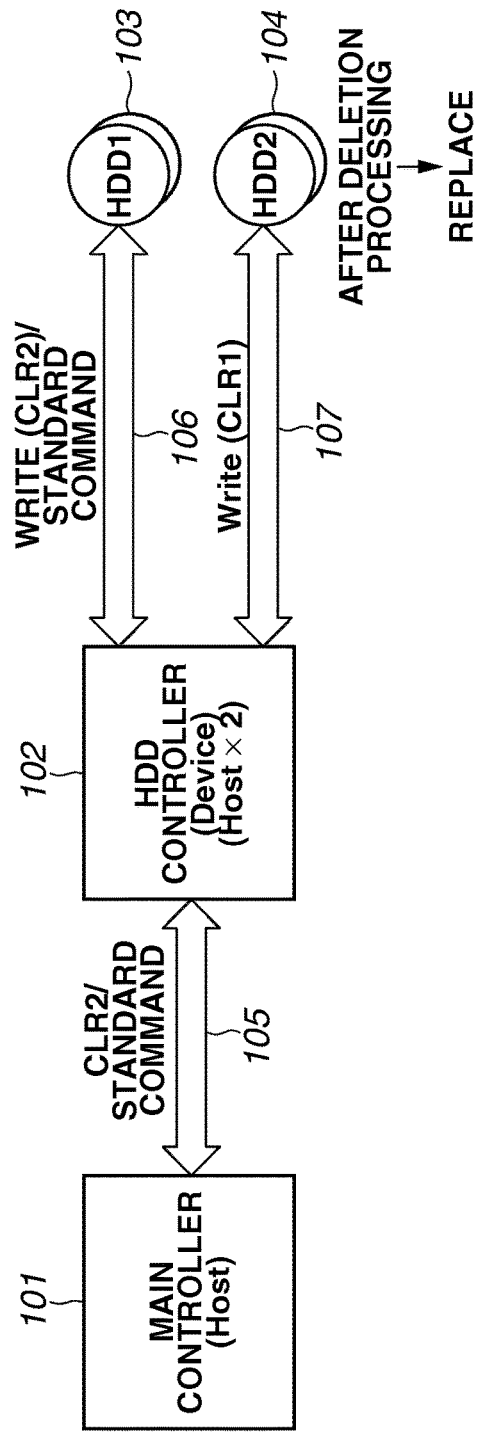

SETTINGS FOR OVERWRITE
DELETION WHEN DISCARDING (CLR1)

DISPLAY OF OVERWRITE DELETION
PROGRESS WHEN DISCARDING

OVERWRITE DELETION SETTINGS
BY PRINT JOB UNIT (CLR2)

CONTROL APPARATUS AND CONTROL METHOD THEREFOR

CROSS-REFERENCE TO RELATED APPLICATION

This application is a Continuation of U.S. application Ser. No. 12/762,652, filed Apr. 19, 2010, which claims priority from Japanese Patent Application No. 2009-105411 filed Apr. 23, 2009, which are hereby incorporated by reference herein in their entireties.

BACKGROUND OF THE INVENTION

Field of the Invention

The present invention relates to a control apparatus and a control method for the control apparatus.

Description of the Related Art

Conventionally, when discarding a storage apparatus such as a hard disk apparatus (hereinafter a hard disk apparatus is used as an example of a storage apparatus) mounted, for example, in a personal computer (PC) or a printer, data in the hard disk apparatus is deleted to prevent leakage of confidential data. However, it is increasingly common to completely delete data using a process of overwriting the files on a predetermined number of times with specific pattern data in addition to deletion of file management data in the hard disk apparatus.

Recently, enhanced security awareness has caused, other than when hard disks are discarded, a need for overwrite-deletion by a printing job unit of the operation region in the hard disk apparatus including intermediate data generated in processing steps and print data from the print processing steps.

A conventional overwrite-deletion method is configured so that a central processing unit (CPU) that manages the system generates pattern data on a memory to thereby enable use of the pattern data to overwrite a file in the hard disk apparatus on a predetermined number of times.

However, when the size of the file to be deleted by overwriting is extremely large or when a consecutive region on the memory cannot be ensured, a large load is placed on the CPU by use of an inefficient method in which the above process is repeated many times.

In addition to the conventional method above, a method executing an overwrite-deletion process has been discussed in Japanese Patent Application Laid-Open No. 2005-346306, by adding overwrite-deletion conditions to file management information managed by a file system of an operating system (OS).

In the method discussed in Japanese Patent Application Laid-Open No. 2005-346306, a hard disk controller is provided between a CPU for managing the system and the hard disk apparatus. When file management information stored in the hard disk apparatus is updated, overwrite-deletion conditions stored in the file management information are read out by the hard disk controller. The hard disk controller itself uses the overwrite-deletion conditions to execute overwrite-deletion processing.

Thus, the load on the CPU managing the system is reduced and overall processing efficiency of the system is improved by a configuration in which only updated management information is written into the hard disk apparatus.

However, the method discussed in Japanese Patent Application Laid-Open No. 2005-346306 uses extension of the file management information of the file system.

In recent built-in apparatuses such as printers, complexity of the configuration is increased, and often they are configured by a plurality of OS. Since a range of OS types from built-in OS to general purpose OS are used, technical and other situations arise due to the dedicated extension of the file management information.

Furthermore, since the hard disk controller is to rewrite the file management information, when a mirroring system is configured using a plurality of hard disks, control operations are complicated because the same management information for a plurality of objects is to be updated. Consequently, there are difficulties for application of the method, which is discussed in Japanese Patent Application Laid-Open No. 2005-346306, to a wide range of system configurations.

SUMMARY OF THE INVENTION

According to an aspect of the present invention, an apparatus includes a receiving unit configured to receive a command for controlling at least one of a plurality of storage apparatuses from a host apparatus, a sending unit configured to send overwrite data configured to overwrite a region storing data to a specific storage apparatus, when the received command is a deletion command to delete the stored data, and a control unit configured to store the received command at least until completion of sending of the overwrite data if the received command is a command for the specific storage apparatus, when a new command is received during sending of the overwrite data to the specific storage apparatus, or store information indicating intermediate processing of sending of overwrite data and perform priority execution of the received command, or when the received command is not a command for the specific storage apparatus, execute processing of the command.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 6A and 6B illustrate an example in which the overwrite-deletion process according to an exemplary embodiment of the present invention is applied to a mirroring system.

DESCRIPTION OF THE EMBODIMENTS

Figure 1:
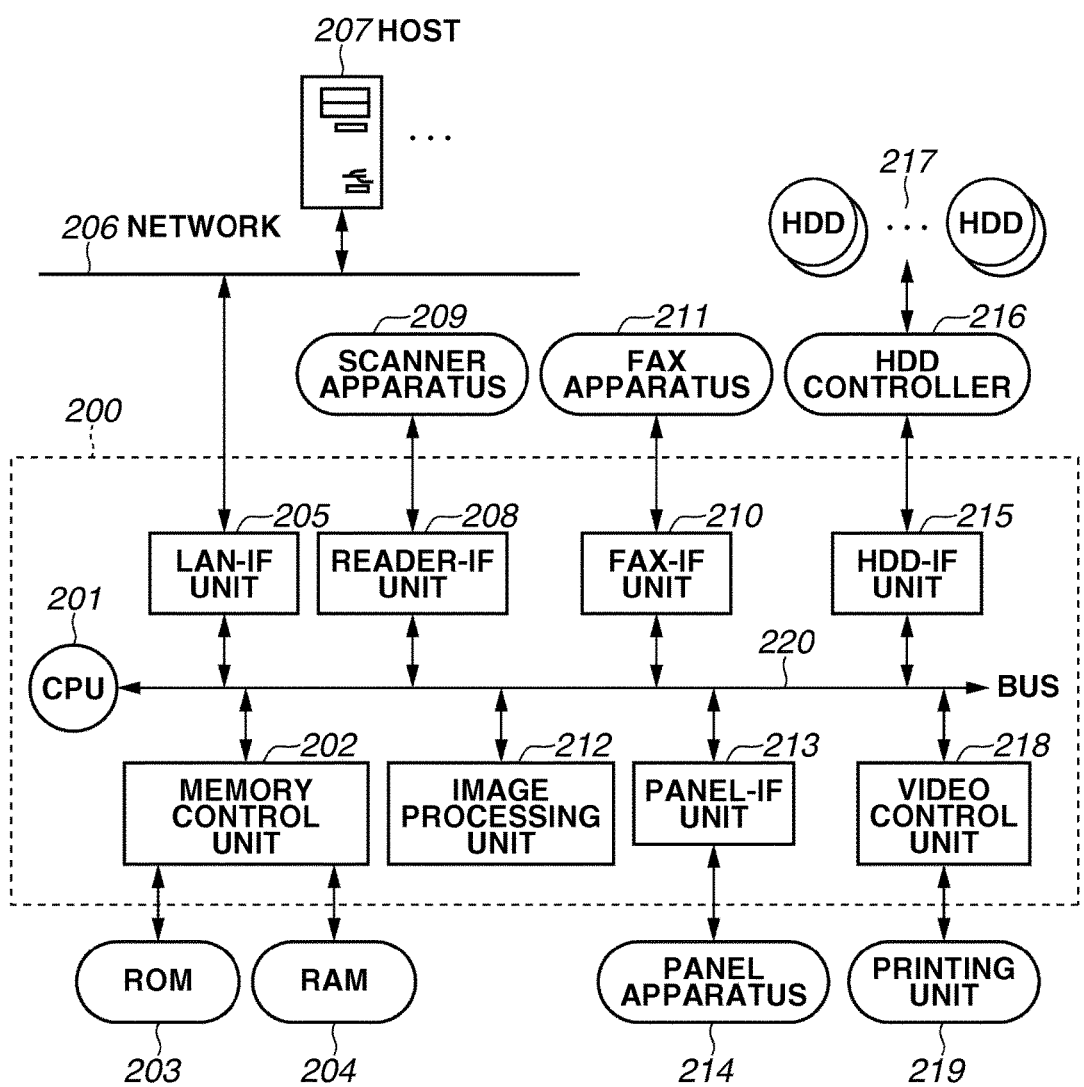
FIG. 1 is a block diagram illustrating an example of a main controller system configured to control a plurality of apparatuses.

Various exemplary embodiments, features, and aspects of the invention will be described in detail below with reference to the drawings.

Elements of one embodiment may be implemented by hardware, firmware, software, or any combination thereof. The term hardware generally refers to an element having a physical structure such as electronic, electromagnetic, optical, electro-optical, and mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store or transfer information. Examples of the processor readable or machine accessible medium that may store include a storage medium, an electronic circuit, a semiconductor memory device, a read only memory (ROM), a flash memory, an erasable programmable ROM (EPROM), a floppy diskette, a compact disk (CD) ROM, an optical storage medium, a magnetic storage medium, a memory stick, a memory card, a hard disk, etc. The machine accessible medium may be embodied in an article of manufacture. The machine accessible medium may include information or data that, when accessed by a machine, causes the machine to perform the operations or actions described above. The machine accessible medium may also include program code, instruction or instructions embedded therein. The program code may include machine-readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send, and receive data to and from a hardware device. An apparatus may include any combination of hardware, software, and firmware modules.

FIG. 1 is a block diagram illustrating a printing apparatus to which a control apparatus according to the present exemplary embodiment can be applied, and in particular, a multifunction peripheral. In the present exemplary embodiment, the storage apparatus and the control apparatus for controlling the storage apparatus will be described respectively using an example of a hard disk and a hard disk controller. However, the present invention can be applied to a storage apparatus other than a hard disk and a control apparatus therefor.

A main controller 200 for a multifunction peripheral illustrated in FIG. 1 includes a CPU 201. The CPU 201 executes system control and calculation processing. A memory control unit 202 executes direct memory access (DMA) control and input/output control to various memory devices.

A read only memory (ROM) 203 is configured by a non-volatile memory. The ROM 203 stores data that is not updated such as startup programs or fonts. In the present exemplary embodiment, the ROM 203 is configured to execute rewrite operations by use of a Flash-ROM. A random access memory (RAM) 204 is a volatile memory such as a synchronous dynamic random access memory (SDRAM) or a double data rate (DDR). The RAM 204 is used for a storage region for print data or an operation region of a program, which is to be rewritten.

A local area network interface (LAN-IF) 205 executes interface operations with a local area network 206 connected to a printing apparatus and generally complies with a transmission control protocol of an internet protocol (TCP/IP). The main controller 200 is connected to network enabled apparatuses such as an external HOST 207 by a network cable and executes printing operation via the network.

A Reader-IF unit 208 is configured to control communication with a scanner apparatus 209. A copying function is executed by inputting image data scanned by the scanner apparatus 209. A FAX-IF unit 210 is configured to control communication with a FAX apparatus 211. The FAX apparatus 211 is connected to a telephone line to execute sending and receiving of FAX data.

An image processing unit 212 executes various image processing operations on image data, which is input via the LAM-IF unit 205, the Reader-IF unit 208, and the FAX-IF unit 210. A panel-IF unit 213 executes communication control with a panel apparatus 214. The panel apparatus 214 is a user interface (UI) configured to enable confirmation of the state and various types of setting operations for a printing apparatus by operation of a liquid crystal display or buttons on a panel.

A hard disk interface (HDD-IF) 215 executes input/output control of data of a hard disk (HDD) controller 216. One or a plurality of hard disk (HDD) apparatuses 217 is connected to the HDD controller 216 to thereby control input and output of data using an AT Attachment (ATA) standard (Parallel ATA or Serial-ATA).

The HDD controller 216 is configured to execute redundant array of independent disks (RAID) control including mirroring processing by connection of a plurality of HDD apparatuses. The HDD apparatus 217 is a non-volatile large capacity storage apparatus and is used as a temporary storage location for print data or to store files.

A video control unit 218 is configured to communicate commands or status with a printing unit 219, and transfer print data generated from the memory thereto. The printing unit 219 is the printing apparatus main body and is configured to execute printing of print data on paper mainly in accordance with command information from the video control unit 218. A system bus 220 is a bus representing, for the sake of convenience, a control bus, data bus, and a local bus and signal line between an arbitrary blocks.

The present exemplary embodiment is related to data deletion in the HDD apparatus 217 connected to the HDD controller 216. In the present exemplary embodiment, although the description will assume connection of the HDD controller 216 as a separate chip or board to an external unit of the main controller 200 described in FIG. 1, naturally, the HDD controller 216 may be integrated with the main controller 200 as a single chip.

Figure 2:
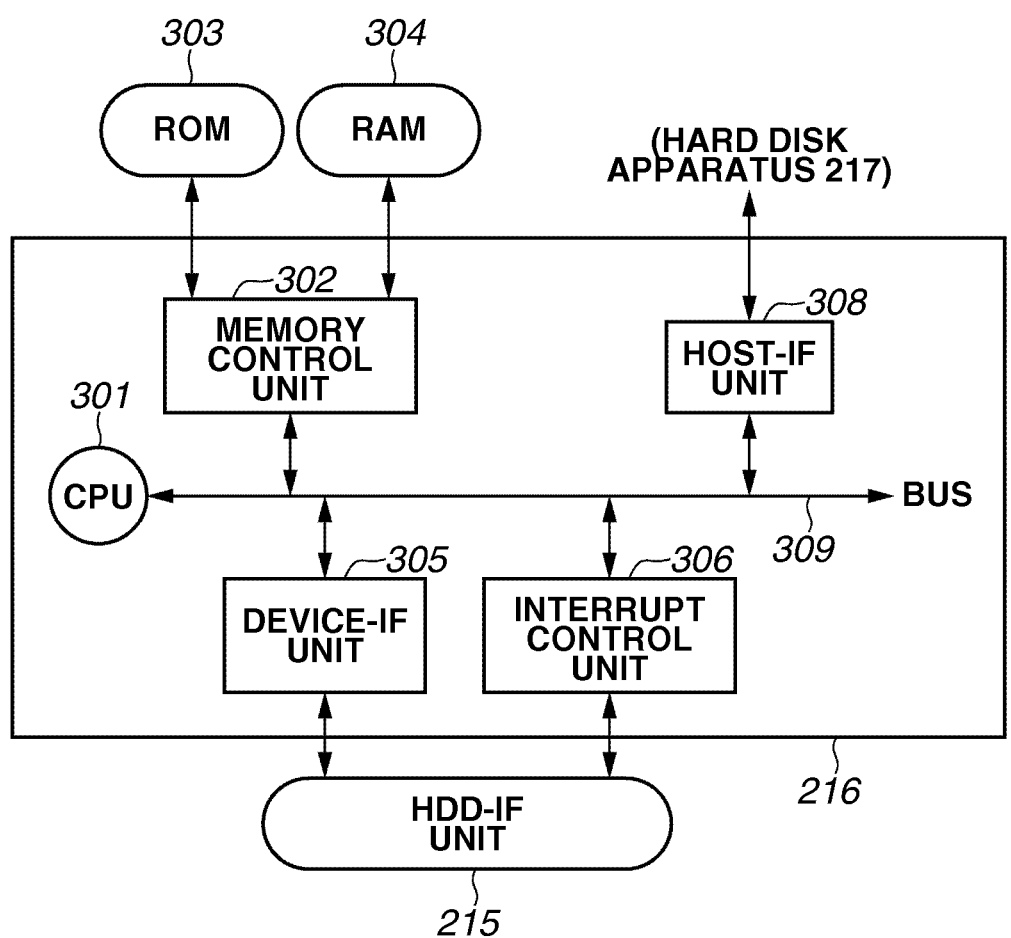
FIG. 2 is a block diagram illustrating an example of a hard disk controller.

FIG. 2 is a block diagram illustrating a configuration example of an HDD controller 216.

In FIG. 2, a CPU 301 executes system control, RAID control, calculation processing, and processing of ATA-standard commands. A memory control unit 302 is configured to execute DMA control and input/output control to various memory devices. A ROM 303 is a non-volatile memory configured to store data that is not frequently updated such as startup programs and various types of mode setting values. In the present exemplary embodiment, a Flash-ROM is used in the ROM 202 to enable rewriting operations.

A RAM 304 is a volatile memory represented by an SRAM or a DDR memory. The RAM 304 is used to store temporary data or a program operation region, which is to be rewritten. The HDD-IF unit 215 represents an input/output unit for the HDD controller 216 connected to the main controller 200.

A Device-IF unit 305 executes input/output control of data and ATA-standard device commands. The Device-IF unit 305 is connected with the HDD-IF unit 215 of the main controller 200 illustrated in FIG. 1.

The Host-IF unit 308 executes input/output control of data and ATA-standard host commands. The Host-IF unit 308 is connected with the external HDD apparatus 217. The HDD apparatus 217 may include a number of hard disks for a RAID system architecture (for example, two HDDs for mirroring processing) and a Host control circuit may be included in the Host-IF unit 308.

An interrupt control unit 306 is configured to execute output control and masking of various types of interrupt signals. A system bus 309 represents, for the sake of convenience, a control bus, data bus, and a local bus and signal line between an arbitrary blocks.

Figure 3:
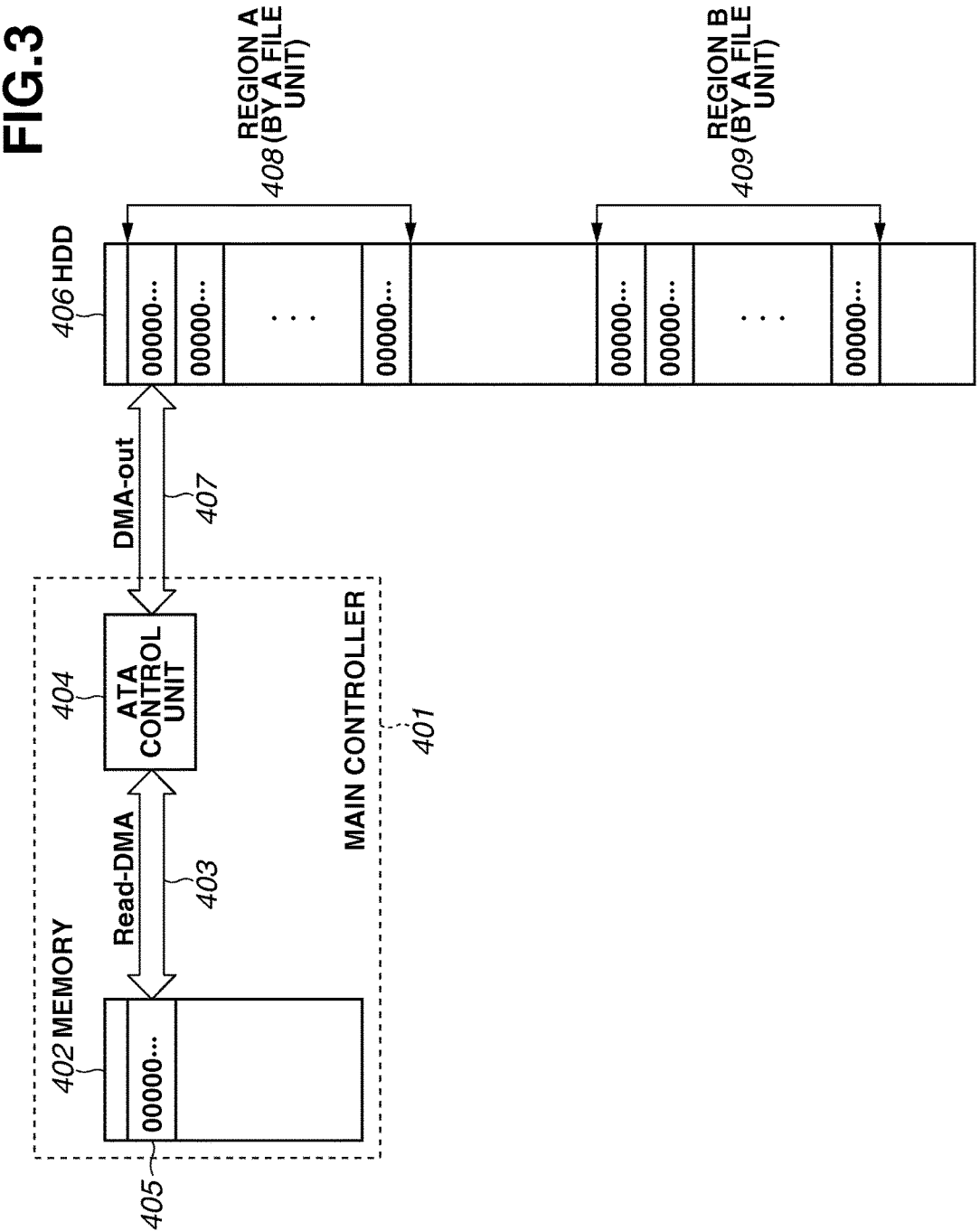
FIG. 3 is a block diagram illustrating a conventional overwrite-deletion method.

An overwrite-deletion method according to the present exemplary embodiment will be described in detail below with reference to FIG. 3 to FIG. 5. FIG. 3 illustrates an example of a conventional overwrite-deletion method. As used herein, "overwrite-deletion" denotes a method to delete data by overwriting a predetermined pattern onto existing data in an HDD apparatus.

As illustrated in FIG. 3, a main controller 401 is connected by an ATA control unit 404 via an ATA bus 407 to a hard disk apparatus (HDD) 406.

When executing overwrite-deletion of a predetermined region (region A408 and region B409) in the HDD 406, firstly a consecutive region 405 is ensured in the system memory 402 and writing of the overwrite data pattern (in the FIG. 3, "0" data) is executed in the region. After completing preparation of the memory, startup is executed after setting desired settings in a direct memory access controller (DMAC) and an ATA control unit 404 in a memory control unit (not illustrated).

In response thereto, the DMAC and ATA control unit 404 execute overwrite-deletion of data in the memory region 405 by DMA transfer (read-DMA 403) by executing write processing in the same range as the region A408 in the HDD 406 to be deleted. For example, data in a memory region 405 is overwrite-deleted by write processing on a rectangular region at the head of the region A408 (the ATA standard issues a command in DMA-out transfer protocol).

When overwrite-deletion is executed for a predetermined number of times, the above sequence is repeated by the predetermined number. The region on the HDD 406 for overwrite-deletion (region A408, region B409) designates a portion or the whole of the file by a file unit (cluster unit) based on the management information of the file system.

The conventional overwrite-deletion method described above using a CPU of a main controller encounters difficulties when ensuring a large consecutive region on the system memory. Consequently, a small amount of deletion is to be repeated numerous times in order to delete a large region in an HDD apparatus (in recent years, print data size has drastically increased as a result of high-quality imaging or color imaging). Furthermore, only sequential processing can be executed since normally continuous commands cannot be issued during transfer using an ATA standard.

For the above reasons, the conventional method is inefficient due to the high load on the main CPU that controls the system.

Figure 4:
FIG. 4 illustrates an overwrite-deletion method according to an exemplary embodiment of the present invention.

FIG. 4 illustrates an overwrite-deletion method according to the present exemplary embodiment.

As illustrated in FIG. 4, an HDD controller 502 (HDD controller 216 in FIG. 1) is connected using ATA buses 504, 505 (or a cable) between a main controller 501 (main controller 200 in FIG. 1) and a hard disk apparatus (HDD) 503 (HDD apparatus 217 in FIG. 1). The present exemplary embodiment will describe a configuration in which the HDD controller 502 is provided in an external unit of the main controller 501. However, the HDD controller 502 may be provided in the main controller 501 (board and chip).

The CPU (CPU 201 in FIG. 1) that executes system control of the main controller 501 obtains management information for the file system to thereby calculate a deletion range by sector unit (e.g., region A506, region B507) in the HDD 503. When the regions are separated, the CPU executing system control of the main controller 501 acquires an overwrite deletion size (sector number) together with the number of regions and corresponding header sector addresses.

The CPU executing system control of the main controller 501 generates overwrite-deletion request data including a predetermined overwrite data pattern number and an overwrite number. An actual example of overwrite-deletion request data is illustrated in FIG. 5.

Figure 5:
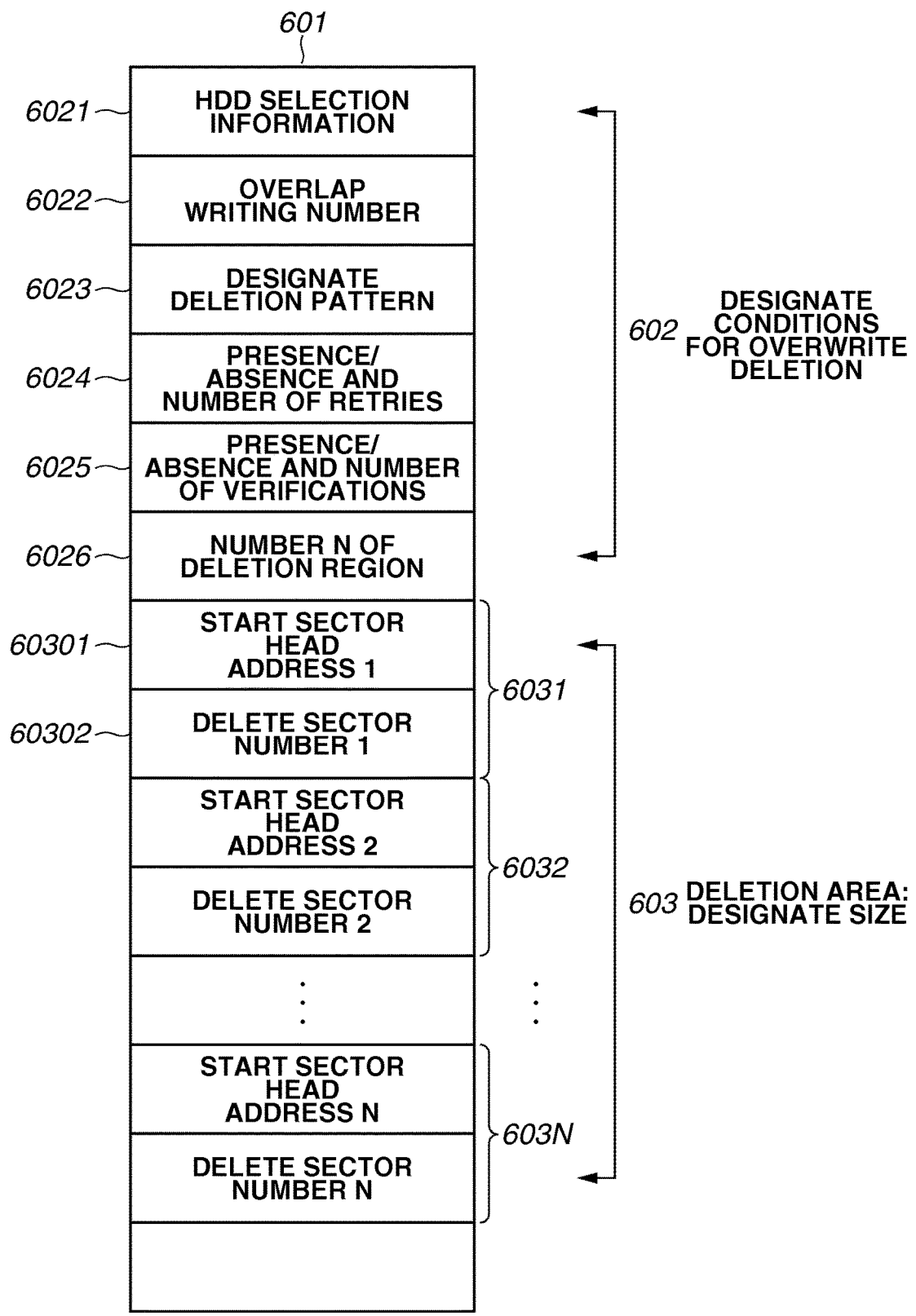
FIG. 5 illustrates an example of attribute data that is added to an overwrite-deletion request command.

FIG. 5 illustrates an example of an overwrite-deletion request data in the overwrite-deletion method according to the present exemplary embodiment. As illustrated in FIG. 5, in sequence from the header, overwrite-deletion request data 601 includes overwrite-deletion conditions 602 and deletion region and size designation 603 configured to designate the deletion region and size.

Further details of the overwrite-deletion conditions 602 include HDD selection information 6021, overwriting number 6022, deletion pattern designation 6023, presence/absence and number of retries 6024, presence/absence and number of verifications 6025, and number N of deletion regions 6026. The HDD selection information 6021 selects which of the plurality of HDD apparatuses to be an object of overwrite-deletion processing and may select one up to all HDD apparatuses.

The presence/absence and number of retries 6024 designates a number of re-processing operations (retries) when an error is generated when accessing the HDD apparatus. The presence/absence and number of verifications 6025 designates the number of comparative processing operations (verifications) configured to verify whether the actual writing number into the HDD apparatus coincide with the overwrite-deletion pattern.

Furthermore, the deletion region and size designation 603 states the deletion region 6031-603N corresponding to the group number expressed by the deletion region number N 6026. The deletion region 6031-603N states the initial sector header address 60301 and the deletion sector number 60302.

Now, returning to FIG. 4, the deletion command will be described below. In the present exemplary embodiment, a deletion command to be used for overwrite deletion request to the HDD controller 502 is predefined as an extension command based on the ATA standard. For example, a series of deletion command groups are defined in advance, which are configured by combining sub-commands defined by a user and vector unique commands defined in the ATA standard.

Use of an ATA standard enables the provision, between the main controller 501 and the HDD controller 502, of the series of deletion command groups as an extension command according to a Non-Data transfer or a programmed input/output (PIO) transfer protocol. Thus, in the present exemplary embodiment, there is no particular requirement for use of a bus having a dedicated extension in addition to the ATA standard bus (or cable).

As described above, when the HDD controller 502 is included as a constitutive element of the main controller 501, there is no particular requirement for compliance with an ATA standard and a dedicated bus specification may be used.

The processing flow of the overwrite-deletion process will be described below. Firstly, the main controller 501 issues a deletion request to the HDD controller 502 in a format (PIO transfer protocol when using the ATA standard) in which overwrite-deletion request data is added as attribute data to some of the deletion command groups.

When the HDD controller 502 receives a command, the received command is firstly determined whether it is an extension command or a standard command (normal command when defined in the ATA standard).

When it is determined that the received command is a standard command, the HDD controller 502 issues the received command without modification to the HDD 503 and executes the normal access processing.

On the other hand, when it is determined that the received command is an extension command, the HDD controller 502 terminates issuance of the received command to the HDD 503 and executes a predetermined process that will be described below.

When the extension command is a deletion command for an overwrite-deletion request, the HDD controller 502 analyzes the added attribution data (the overwrite-deletion request data in FIG. 5). Then the HDD controller 502 overwrites the deletion sector number 60302 from the start sector header address 60301 for the deletion regions 6031-603N.

The HDD controller 502 uses a pattern designated by the deletion pattern designation 6023 to issue a Write command (DMA command complying with DMA-out transfer protocol in the ATA standard) for the number designated by the overwriting number 6022 to the HDD 503. In this manner, the region A506 and the region B507 in the HDD 503 can be deleted by overwriting by a sector unit.

Acquisition of the intermediate overwrite-deletion process and the final result is enabled by issuance of an overwrite-deletion status request by the main controller 501.

In this manner, the overwrite-deletion process according to the present exemplary embodiment may be executed by the CPU of the main controller 501 only by generating predetermined attribute data and basically executing a request corresponding to a single deletion command to the HDD controller 502. In the present exemplary embodiment, the processing efficiency of the overall system is improved since there is no requirement to ensure a consecutive region in a memory region of the main controller 501 and repetitively to access the HDD 503.

In the present exemplary embodiment, a configuration of deletion request commands with added attribute data is adopted without the HDD controller directly analyzing and rewriting file management information. The attribute information contains the header sector address of the region to be deleted, the deletion sector size, and other deletion conditions.

In the present exemplary embodiment, the data stored in the hard disk apparatus is handled by a sector unit without handling the data by a file (or by a cluster). In this manner, processing executed by the hard disk controller is simplified, thereby enabling application to a wide range of system configurations.

FIG. 6 illustrates an example of a mirroring (RAID1) system. A mirroring system is a method configured to generate a backup provided for an occurrence of a failure by simultaneously writing the write data into a plurality of other hard disk apparatuses in addition to a master hard disk apparatus.

An example of application of the mirroring system to the present exemplary embodiment will be described below with reference to FIG. 6. The application example in FIG. 6, two hard disk apparatuses are used. However, the present invention may be applied to a system having an arbitrary number of hard disk apparatuses more than two.

In FIG. 6A, the main controller 101 (main controller 200 in FIG. 1), which mounts the ATA-standard compliant Host-IF, is connected via an ATA bus 105 with the HDD controller 102 (HDD controller 216 in FIG. 1).

The HDD controller 102 includes two Host-Ifs for connecting an HDD1 103 and HDD2 104 therewith (HDD 217 in FIG. 1), and one Device-IF for connecting a main controller 101 therewith.

The HDD1 103 is connected via an ATA bus 106 with the HDD controller 102. The HDD2 104 is connected via an ATA bus 107 with the HDD controller 102. The HDD controller 102 has a mirroring function as described above and an overwrite-deletion function as illustrated in FIG. 4 and FIG. 5 described above.

As the overwrite-deletion request commands described above, two types "CLR1" and "CLR2" are defined. CLR1 is a command configured to be executed when an HDD apparatus is discarded. CLR2 is a command configured to execute deletion of all data contained in an operation region during a printing operation by a printing job unit.

Attribute data associated with CLR1 and CLR2 is equivalent to the overwrite-deletion request data 601 as illustrated in FIG. 5. The difference between CLR1 and CLR2 exist in the response timing to the main controller 101.

A CLR1 command outputs a response immediately after completion of receipt of overwrite-deletion request, and is ready to receive another command. On the other hand, a CLR2 command does not respond until completion including that process and consequently cannot receive a subsequent command during that period. This means that the CLR2 command is handled in the same manner as other standard commands.

Next, the CLR1 command and the CLR2 command will be used to describe how an overwrite-deletion command is used in a discard operation and by a printing job unit. FIG. 6A illustrates a state when replacement of hard disk is applied due to some type of abnormality in the HDD2 104 in mirroring processing. An abnormality in the HDD apparatus does not necessarily cause an access failure.

Although access is possible despite of a prior warning caused by partial sector failure, abnormal noise, or SMART information, there are many situations in which the hard disk apparatus is to be replaced. Deletion of user regions, before a service engineer replacing and removing a component, may be performed for improving security when such abnormalities occur.

An example of overwrite-deletion, when discarded, prior to replace the HDD2 104, will be described below with reference to FIG. 6A and FIG. 6B.

In FIG. 6A, the main controller 101 selects the HDD2 104 to be discarded, and issues a CLR1 command to the HDD controller 102. The HDD controller 102 having received the CLR1 command immediately responds to the main controller 101 after confirming the details of attribute data.

Then, the HDD controller 102 uses the details of the attribute data (HDD selection information 6021) added to the CLR1 command to select a relevant hard disk. In this case, the HDD2 104 is selected as the relevant hard disk.

The HDD controller 102 executes an overwrite-deletion process on designated number of regions from a head address of a designated sector in the relevant hard disk on a designated number of times with a designated pattern. The notation "Write (CLR1)" in FIG. 6A indicates a Write command issued for a CLR1 command process (DMA command in the ATA-standard DMA-out transfer protocol).

FIG. 6B illustrates a case where another command (CLR2 or standard command) is issued from the main controller 101 during an overwrite-deletion process (Write (CLR1)) of the HDD2 104.

When another command is received in CLR1 processing, the HDD controller 102 processes the received another command if the received another command does not relate to the HDD2 104 under CLR1 processing.

The received another command is processed in parallel with the CLR1 processing. After temporarily suspending the CLR1 process at a predetermined break and saving the intermediate process in the ROM. 303, the HDD controller 102 may execute control so that the received another command undergoes priority processing. After priority processing of another command, the HDD controller 102 executes control so that the CLR1 process is automatically restarted.

When another command is received by the HDD2 104 in CLR1 processing, the HDD controller 102 executes the following control. The HDD controller 102 saves the received another command at least until completion of CLR1 processing, or saves the partially processed CLR1 process in the ROM 303 and executes priority processing of the received command.

The CLR2 command (overwrite-deletion by a printing job unit) may be issued as the another command. When the CLR2 command is selectively issued to the HDD2 104 to be discarded in execution of CLR1 processing, the operation may be determined to be meaningless and a predetermined error process may be executed.

Also when a command other than CLR2 is selectively issued to the HDD2 104 to be discarded during execution of CLR1 processing, the operation may be determined to be meaningless and a predetermined error process may be executed.

After completion of CLR1 processing, the internal status of the HDD controller 102 is changed to a completion state. The internal status is notified to the main controller 101 of completion of processing according to an overwrite-deletion status request command described in FIG. 4. However, it is of course possible to use an interrupt signal to notify completion of CLR1 processing to the main controller 101.

As described above, according to the present exemplary embodiment, normal access is possible to normal hard disk apparatuses while executing overwrite-deletion of the hard disk apparatus that has failed. Thus a mirroring system can be configured with improved efficiency by eliminating user downtime and enhanced security.

Figure 7A:
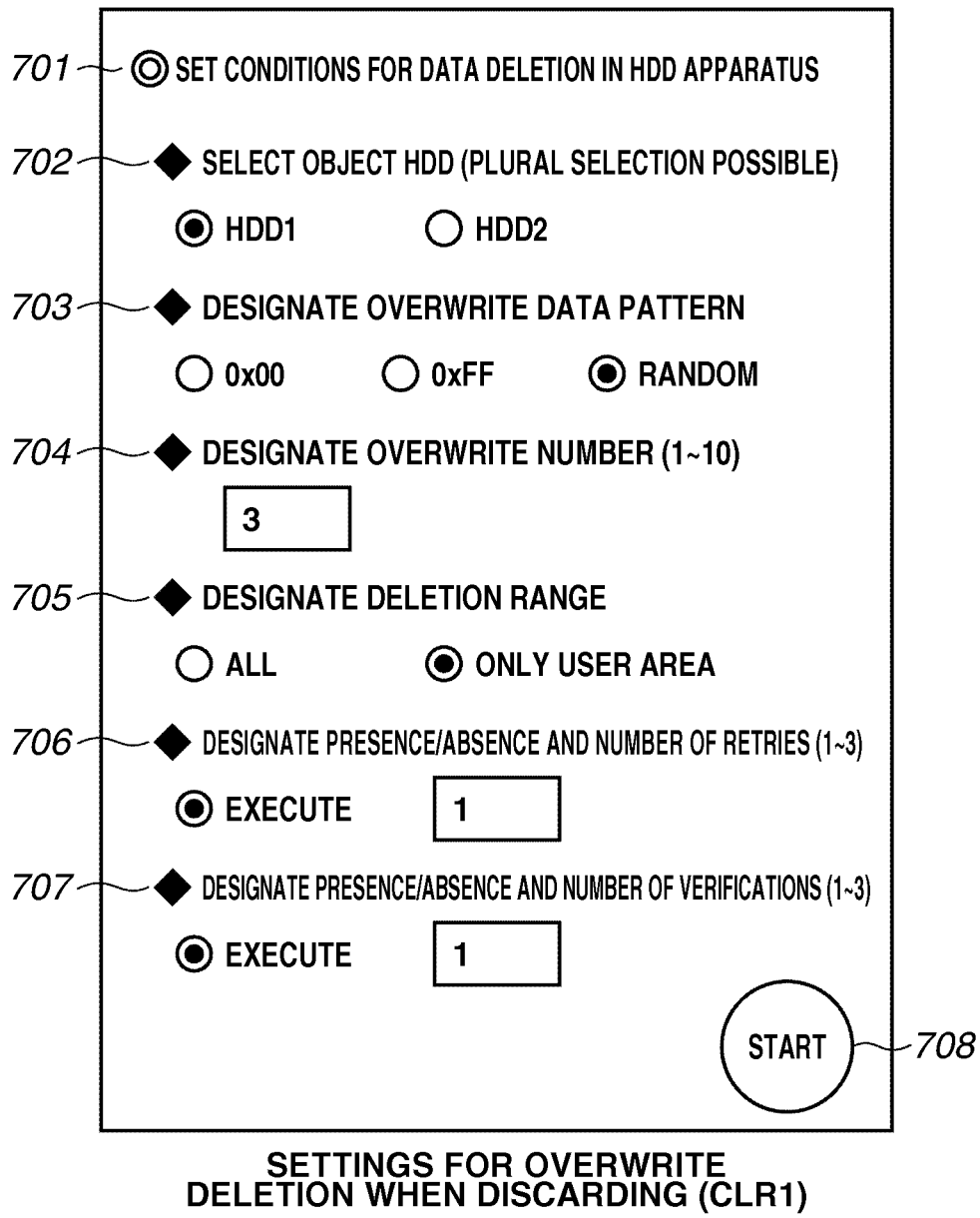
FIGS. 7A, 7B, and 7C illustrate an example of a display screen and settings for an overwrite-deletion process.
Figure 7B:
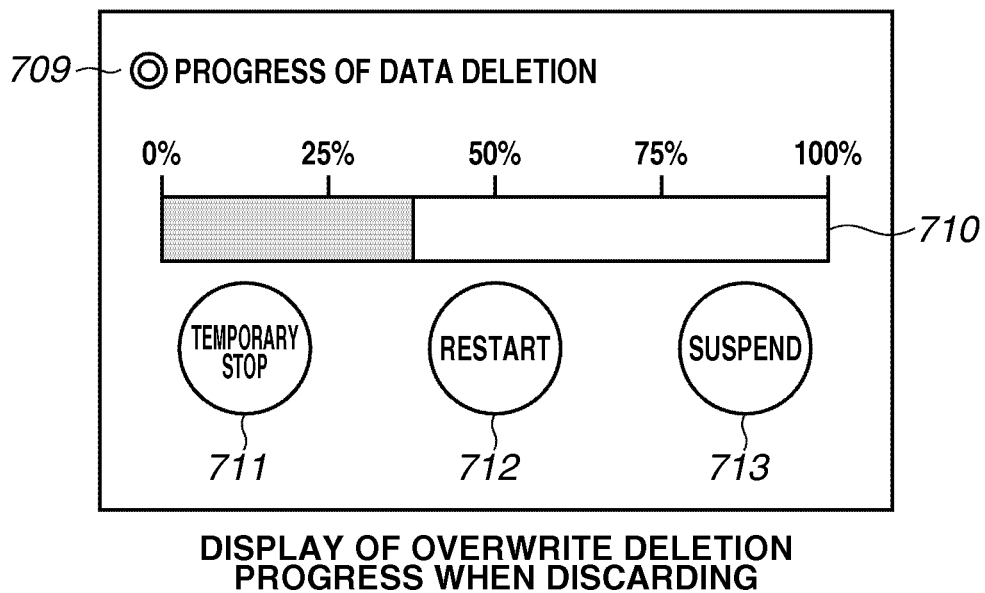
Figure 7C:
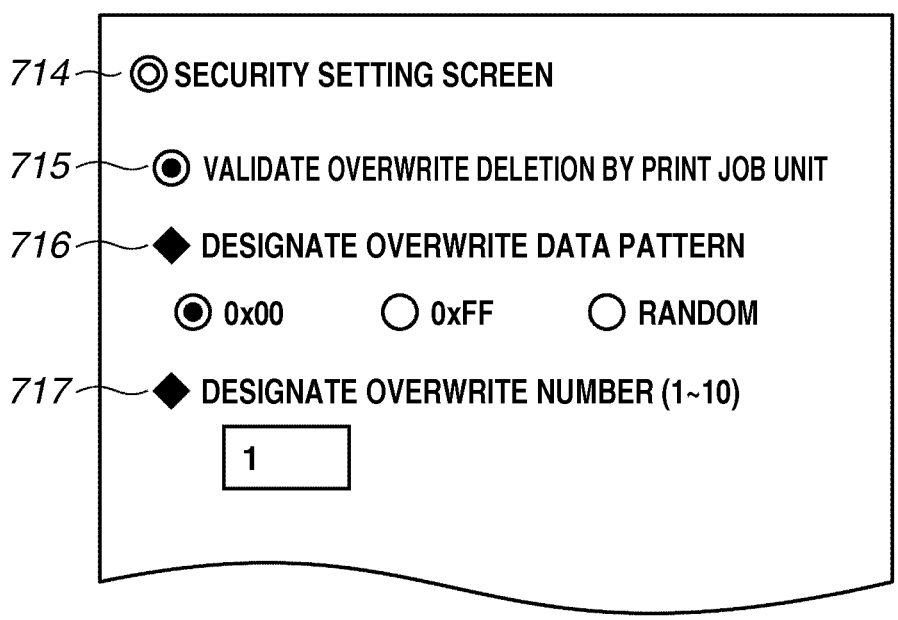

Next, an overwrite-deletion setting screen will be described referring to FIGS. 7A, 7B, and 7C. FIGS. 7A, 7B, and 7C illustrate an example of a display screen and settings in deletion by a printing job unit (when a CLR2 command is used) and discard operations (a CLR1 command is used).

A screen 701 illustrated in FIG. 7A illustrates an overwrite-deletion (CLR1) setting screen when a discard operation is performed. The screen 701 is displayed by the CPU 201 on a display unit of the panel apparatus 214 according to setting instructions for overwrite-deletion (CLR1) when a discard operation is performed as a result by a user operating a button or liquid crystal display on the panel apparatus 214. An example of detailed settings will be described from the beginning of the sequence.

In "select object HDD (HDD apparatus)" 702, a minimum of one to all HDDs are selected as an object for discarding (in FIG. 7A, HDD 1 is selected). In "overwrite data pattern setting" 703, a fixed value or a random value is selected. However, in this process, fixed and random values may be combined. For example, the process may configure the setting as (fixed value: 0x00, random value) and execute deletion using the 0x00 data for the first time and use the random value for the second time.

In "overwrite number designation" 704, the repetition number of overwrite-deletion processes by a designated overwrite data pattern is designated. In "deletion range designation" 705, a predefined partial or entire region is designated. Furthermore, the deletion range designation may be configured to directly input a header sector address and deletion size.

In "designate presence/absence and number of retries" 706, the presence or absence of retries and the number of retries, when an error occurs, are designated. In "designate presence/absence and number of verifications" 707, the presence or absence of verifications of an overwritten data pattern and the number of verifications are designated. Processes other than "select object HDD" 702 described above do not require specific input when processing is executed using a predetermined flow.

An overwrite-deletion process on the selected HDD is started when the start button 708 is pressed.

A screen 709 illustrated in FIG. 7B enables control and confirmation of the progression of the overwrite-deletion (CLR1) in discard operations. The screen 709 is displayed by the CPU 201 on a display unit of the panel apparatus 214 according to progression confirmation instructions for overwrite-deletion (CLR1) in discard operations input by a user operating a button or liquid crystal display on the panel apparatus 214. An example of setting items will be described from the beginning of the sequence.

In "bar display" 710, the progression acquired from status information for an overwrite-deletion status request command is displayed. The overwrite process is temporarily stopped by pressing the "temporary stop button" 711 of the screen 709 and the processing can be restarted by pressing the "restart button" 712.

Deletion processing can be suspended (stopped) by pressing the "suspend button" 713. Although not illustrated, when each of the "temporary stop button" 711, the "restart button" 712 and the "suspend button" 713 are pressed, a deletion command for the respective processes is issued to the HUD controller 502.

A screen 714 illustrated in FIG. 7C is an overwrite-deletion (CLR2) setting screen by a printing job unit. The screen 714 is displayed by the CPU 201 on a display unit of the panel apparatus 214 according to setting instructions for overwrite-deletion by a printing job unit input by a user operating a button or liquid crystal display on the panel apparatus 214. An example of setting items will be described from the beginning of the sequence.

In "validate overwrite deletion by a printing job unit" 715, the user can designate whether or not to execute overwrite-deletion by a printing job unit. The processes in "designate overwrite data pattern" 716 and "designate overwrite number" 717 are equivalent to the details described for the overwrite-deletion setting screen in discard operations and therefore description will not be repeated. Furthermore, processes other than "validate overwrite deletion by a printing job unit" 715 described above do not require specific input when processing is executed using a predetermined flow.

The object HUD for overwrite-deletion (CLR2) by a printing job unit corresponds to the HDD used in the printing job. In other words, when only one HDD (for example, a primary HDD) is used in a printing job, only that HUD is the object HDD. Furthermore, when all or a plurality of FIDDs are used in a printing job, those HDDs (for example, all or a plurality of HDDs) are the object HDDs.

The process flow on the main controller side for an overwrite-deletion (CLR1) when discarding an HDD apparatus and an overwrite-deletion (CLR2) by a printing job unit will be described hereafter.

Figure 8:
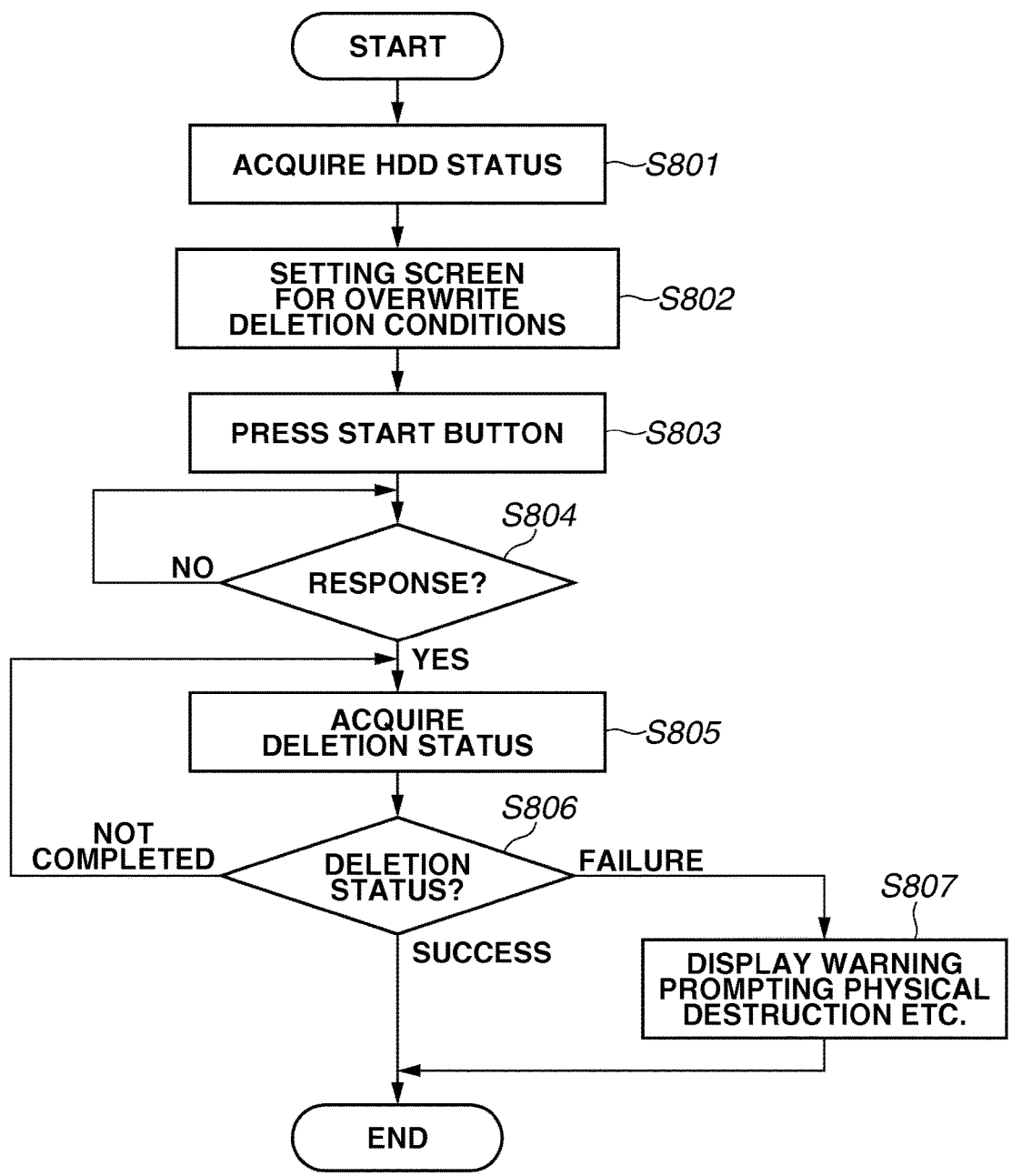
FIG. 8 is a flowchart illustrating a process (CLR1) executed on the main controller side.

FIG. 8 is a flowchart illustrating a CLR1 process executed by the main controller 200. The process illustrated in the flowchart in FIG. 8 is one of functions implemented by the CPU 201, which is configured to read a program recorded in the ROM 203 in the main controller 200 illustrated in FIG. 1.

When an overwrite-deletion instruction input from the panel apparatus 214 in discard operation is received, the CPU 201 of the main controller 200 starts the processing illustrated in the flowchart.

Firstly, in step S801, the CPU 201 acquires an HDD status and stores information including predefined deletion region information or the number of mounted HDDs in a predetermined location. The process executed in step S801 as described above may be executed when a user executes an overwrite-deletion instruction in discard operations or may be pre-executed when turning the power ON.

In step S802, the CPU 201 of the main controller 200 displays the overwrite-deletion setting screen 701 in discard operations and receives settings input by a user.

In step S803, when it is detected that a user has pressed the start button 708, the CPU 201 of the main control 200 generates overwrite-deletion request data 601 (FIG. 5) using information stored in step S801, and values set on the screen 701, and sends the overwrite-deletion request data 601 as attribute data together with a CLR1 command to the HDD controller 216.

After receiving the CLR1 command, the HDD controller 216 responds to the main controller 200 and uses the overwrite-deletion request data added to the CLR1 command to determine the overwrite-deletion conditions. Furthermore, the HDD controller 216 executes CLR1 background processing for the designated HDD.

The CPU 201 of the main controller 200, which has sent the CLR1 command to the HDD controller 216 in step S803, is placed in a response standby state by the HDD controller 216. The period of such a response standby state may be determined by an interrupt standby or a status polling process to the HDD controller 216.

The CPU 201 of the main controller 200 waits for the response from the HDD controller 216 (NO in step S804), and when the response is received (YES in step S804), the process proceeds to step S805. Thereafter, the CPU 201 in the main controller 200 can send a subsequent command to the HDD controller 216.

Then, in step S805, the CPU 201 of the main controller 200 acquires the deletion status (result) from the HDD controller 216 and, in step S806, determines the acquired deletion status.

In step S806, when it is determined that the deletion process is not complete (NOT COMPLETED in step S806), the CPU 201 of the main controller 200 returns the processing to step S805 after a predetermined time period has elapsed, and re-acquires the deletion status.

On the other hand, in step S806, when it is determined that the deletion process has been successful (SUCCESS in step S806), the CPU 201 of the main controller 200 terminates the processing of the flowchart. A message to the effect that the deletion process has been successful may be displayed on the panel display 214.

When it is determined in step S806 that the deletion process has failed (FAILURE in step S806), then, in step S807, the CPU 201 of the main controller 200 displays a warning message that prompts erasure of data in the HDD using another method such as physical destruction. Then the processing in the flowchart is terminated.

Figure 9:
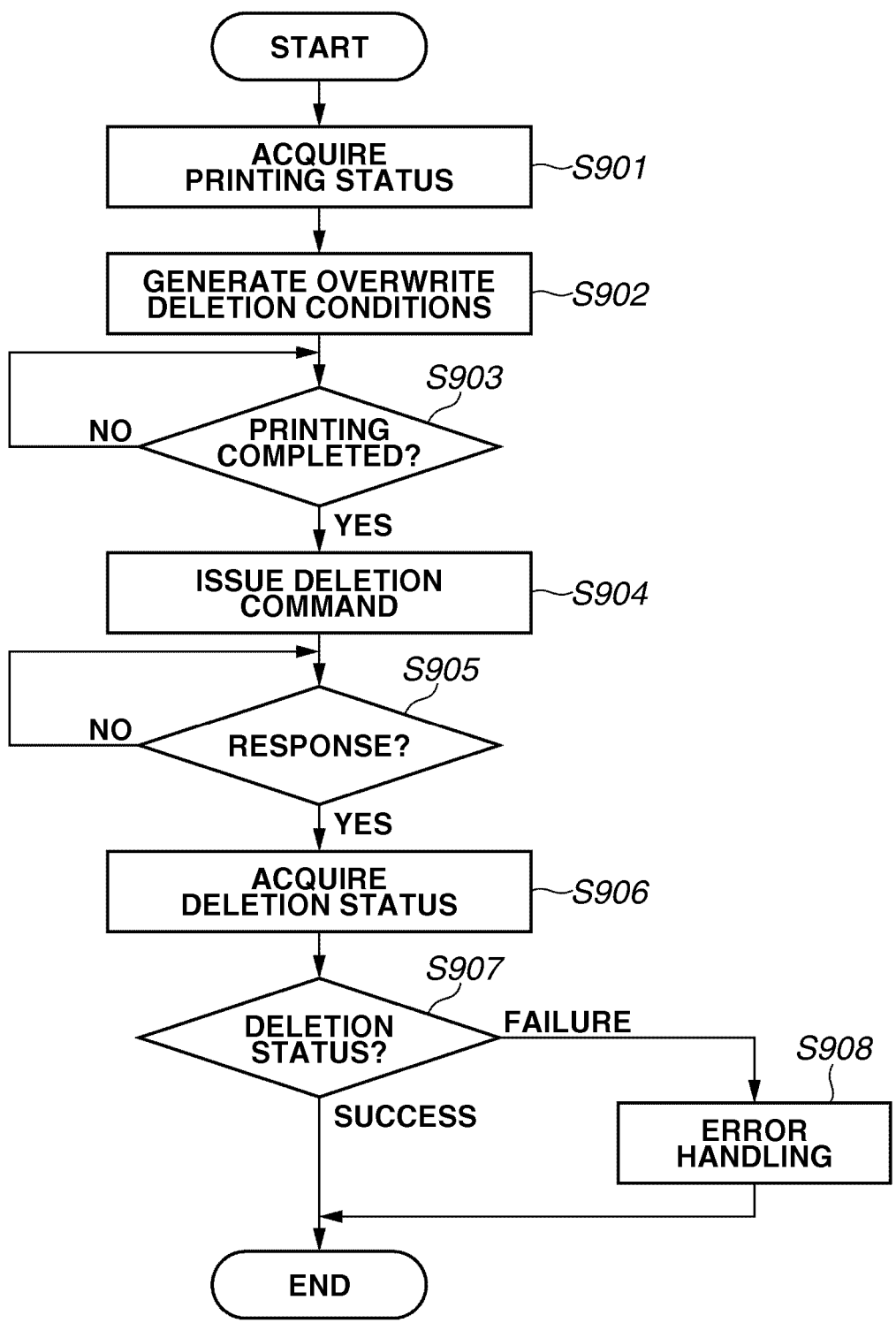
FIG. 9 is a flowchart illustrating a process (CLR2) executed on the main controller side.

FIG. 9 is a flowchart illustrating a CLR2 process executed by the main controller 200. The process illustrated in the flowchart is one of functions implemented by the CPU 201, which is configured to read a program recorded in the ROM 203 in the main controller 200 illustrated in FIG. 1.

When the security setting screen 714 indicates that the overwrite-deletion process by a printing job unit is valid as illustrated in FIG. 6, the CPU 201 of the main controller 200 starts the processing in the flowchart by a printing job execution unit (immediately executed after the printing job).

Firstly, in step S901, the CPU 201 acquires a printing status for the current printing job. The printing status is status information such as the operation region in the HDD used in the printing job (including print data). Furthermore, the operation region may be acquired from file management information or may be a predetermined fixed region.

Then, in step S902, the CPU 201 uses overwrite-deletion conditions stored in the ROM 203 and set in the security setting screen 714 (FIG. 6), and printing status information acquired in step S901 to generate overwrite-deletion request data 601 (FIG. 5).

In step S903, the CPU 201 of the main controller 200 is placed in a printing completion standby state for the current printing job. The CPU 201 of the main controller 200 waits until completion of the current printing processing (NO in step S903), and when completion of printing is confirmed (YES in step S903), the process proceeds to step S904.

In step S904, the CPU 201 sends the overwrite-deletion request data 601 (FIG. 5) generated in step S902 and the CLR2 command to the HDD controller 216. When using a system in which specification of the operation region is not possible until completion of printing processing, the preparation of overwrite-deletion request data in step S902 may be performed after the completion of printing processing.

After receiving the CLR2 command, the HDD controller 216 uses the overwrite-deletion request data added to the CLR2 command to determine the overwrite-deletion conditions, and executes the CLR2 process on a specified HDD. When the CLR2 process is completed, the HDD controller 216 responds to the main controller 200.

The CPU 201 of the main controller 200, which sends the CLR2 command in the step S904 to the HDD controller 216, is placed in a response standby state from the HDD controller 216. The period of such a response standby state may be determined by an interrupt standby or a status polling process to the HDD controller 216.

In step S905, the CPU 201 of the main controller 200 waits for the response from the HDD controller 216 (NO in step S905), and when the response is received (YES in step S905), the process proceeds to step S906. Thereafter, the CPU 201 in the main controller 200 can send the next command to the HDD controller 216.

In step S906, the CPU 201 of the main controller 200 acquires the deletion status (result) from the HDD controller 216 and, in step S907, determines the acquired deletion status.

In step S907, when it is determined that the deletion process has been successful (SUCCESS in step S907), the CPU 201 of the main controller 200 terminates the processing of the flowchart. A message to the effect that the deletion process has been successful may be displayed on the panel display 214.

On the other hand, in step S908, when it is determined, in step S907, that the deletion process has failed (FAILURE in step S907), the CPU 201 of the main controller 200 displays a message on the panel apparatus 214 to the effect that deletion has failed, and executes predetermined error handling. Then the processing in the flowchart is terminated.

Figure 10:
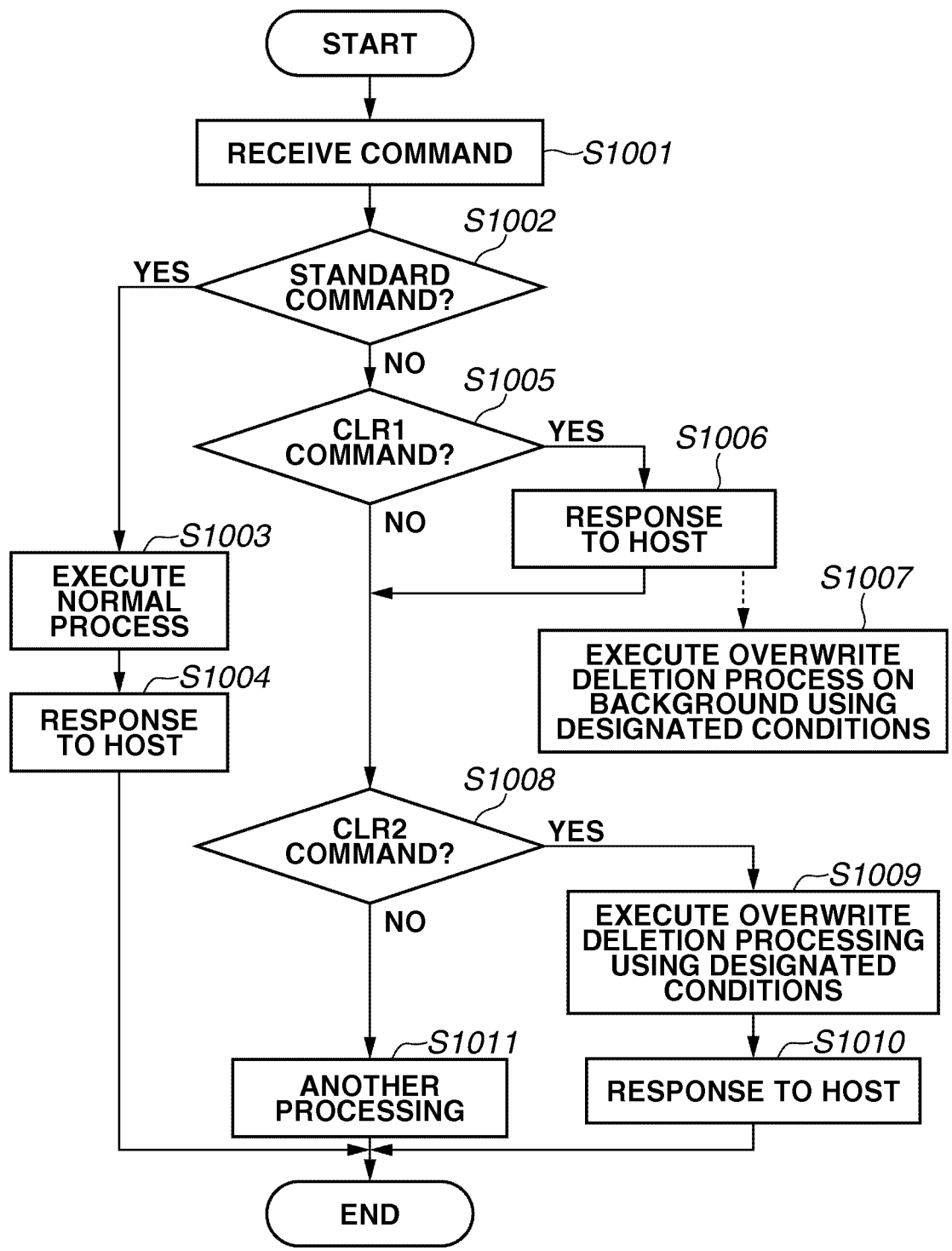
FIG. 10 is a flowchart illustrating an overwrite-deletion process executed in the HDD controller.

Next, the processing flow in the HDD controller 216 will be described. FIG. 10 is a flowchart illustrating an internal process in the HDD controller 216, which has received a standard command, a CLR1 command, or a CLR2 command from the main controller 200. The processing in the flowchart is one of functions implemented by the CPU 301, which is configured to read a program recorded in the ROM 303 in the HDD controller 216 illustrated in FIG. 2.

In step S1001, when a command is received from the main controller 200, the CPU 301 of the HDD controller 216 advances the processing to step S1002. In step S1002, the CPU 301 of the HDD controller 216 determines whether the command received in step S1001 is a standard command defined by the ATA standard or an extension command such as a deletion command. Herein, an extension command is limited to CLR1 and CLR2.

Then, in step S1002 described above, when it is determined that the received command is a standard command (YES in step S1002), the CPU 301 of the HDD controller 216 advances the processing to step S1003.

Then, in step S1003, the CPU 301 of the HDD controller 216 executes normal processing. After completion of the processing, in step S1004, a response is sent to the Host (main controller 200), and then the processing of the flowchart is terminated.

On the other hand, in step S1002, when it is determined that the received command is not a standard command (NO in step S1002), the CPU 301 of the HUD controller 216 advances the processing to step S1005.

In step S1005, the CPU 301 of the HDD controller 216 determines whether or not the command received in the step S1001 is a CLR1 command. In step S1005, when it is determined that the command received in the step S1001 is a CLR1 command (YES in step S1005), the CPU 301 of the HUD controller 216 advances the processing to step S1006.

In step S1006, the CPU 301 of the HDD controller 216 immediately sends a response to the Host (main controller 200) and then, in step S1007, executes overwrite-deletion background processing using the designated conditions.

On the other hand, in step S1005, when it is determined that the received command is not a CLR1 command (NO in step S1005), the CPU 301 of the HUD controller 216 advances the processing to step S1008.

Then, in step S1008, the CPU 301 of the HUD controller 216 determines whether or not the command received in step S1001 above is a CLR2 command. When it is determined in step S1008 that the received command is a CLR2 command (YES in step S1008), the CPU 301 of the HUD controller 216 advances the processing to step S1009.

In step S1009, the CPU 301 of the HDD controller 216 executes overwrite-deletion processing using the designated conditions, and after completion of processing, in step S1010, sends a response to the Host (main controller 200). Then the processing of the flowchart is terminated.

On the other hand, in step S1008, when it is determined that the received command is not a CLR2 command (NO in step S1008), the CPU 301 of the HDD controller 216 advances the processing to step S1011.

In step S1011, the CPU 301 of the HDD controller 216 executes another processing (processing according to the received command), and terminates the processing of the flowchart.

Although not illustrated in FIG. 10, after the CPU 301 of the HDD controller 216 responds to the Host, the CPU 301 is in a received command standby state, which enables reception of a new command from the Host.

In the processing illustrated in FIG. 10, standard command processing is handled in the same manner as a CLR2 command (deletion processing by a printing job unit). Furthermore, after reception of a CLR1 command, immediate response to the Host means that the Host can issue a subsequent command. In the present exemplary embodiment, as described above, the CLR2 command is configured in the same format as a standard command. However, although all overwrite-deletion request commands may be configured in a CLR1 command format, there is no particular limitation on the invention in this regard.

The processing flow when the power is ON and the processing flow when the power is OFF in CLR1 processing will be described below.

Figure 11:
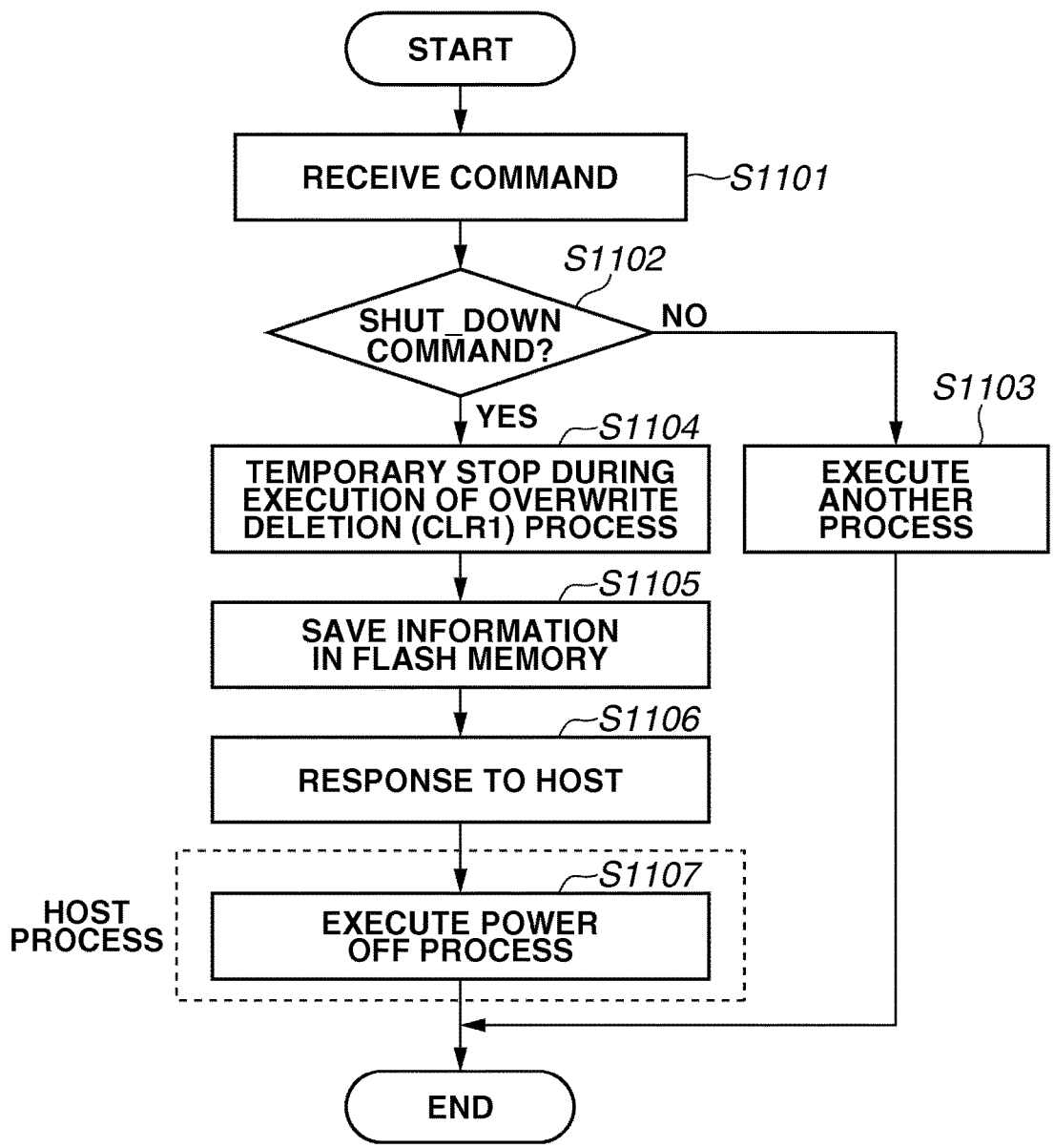
FIG. 11 is a flowchart illustrating a power OFF sequence.

FIG. 11 is a flowchart illustrating processing when the power is OFF in overwrite-deletion processing (CLR1). The processing in the flowchart is one of functions implemented by the CPU 301, which is configured to read a program recorded in the ROM 303 in the HDD controller 216 illustrated in FIG. 2. Herein, as an extension command a Shut_Down command prompting preparation for power OFF is defined.

In step S1101, when a command is received from the main controller 200, the CPU 301 of the HDD controller 216 advances the processing to step S1102. In step S1102, it is determined whether or not the received command is a Shut_Down command. In step S1102, when it is determined that the received command is not a Shut_Down command (NO in step S1102), the CPU 301 of the HDD controller 216 advances the processing to step S1103.

In step S1103, the CPU 301 of the HDD controller 216 executes another processing operation (processing according the received command), and terminates the processing of the flowchart.

On the other hand, when it is determined that the received command is a Shut_Down command (YES in step S1102), the CPU 301 of the HDD controller 216 advances the processing to step S1104.

In step S1104, the CPU 301 of the HDD controller 216 temporarily stops the current overwrite-deletion process (CLR1). When the CLR1 process is not being currently performed, no particular processing is executed in step S1104.

In step S1005, the CPU 301 of the HDD controller 216 stores parameter information (sector address when stopped, overwrite-deletion conditions etc.) until the overwrite-deletion process (CLR1) is stopped in the Flash memory (ROM 303). When CLR1 processing is not being executed at this time, in step S1105, information to the effect that CLR1 processing is not currently performed is stored in the Flash memory (ROM 303).

Next, in step S1106, after completion of preparation for power OFF, the CPU 301 of the HDD controller 216 responds to the Host (main controller 200). Then the processing in the flowchart is completed.

In step S1107, the CPU 201 of the Host (main controller 200) after receiving a response executes a predetermined power OFF sequence to thereby place the power source in the OFF state.

The entire power OFF sequence includes processing configured to issue a Standby command or Sleep command to place the power of the HDD apparatus safely in an OFF state. However, it is described as execution of power OFF processing.

In other words, the Shut_Down command illustrated in FIG. 11 may be rewritten to a command for shutting off the HDD power source (Shut_Down, Standby, or Sleep). For example, when the HDD controller 216 receives a command to shut off a specific HDD power source in overwrite-deletion processing to the specified HDD apparatus, information indicating the progression state of the overwrite-deletion processing is saved in a flash memory.

When the specified HDD apparatus is started up, the HDD controller 216 controls the specified HDD apparatus to restart sending of overwriting data based on the information saved in the flash memory indicating the progression state of the sending of overwrite-deletion data.

Although an example is described in which a response to the Host is executed after the parameter information is saved in the Flash memory, when time is to save such information, the parameter information may be saved after firstly responding to the Host. In this case, the Host (main controller 200) uses polling to confirm status information for the HDD controller 216 or waits for an interruption.

The processing steps, after the power source is placed in the OFF state during CLR processing and subsequently is placed in the ON state, will be described hereafter using FIG. 12.

Figure 12:
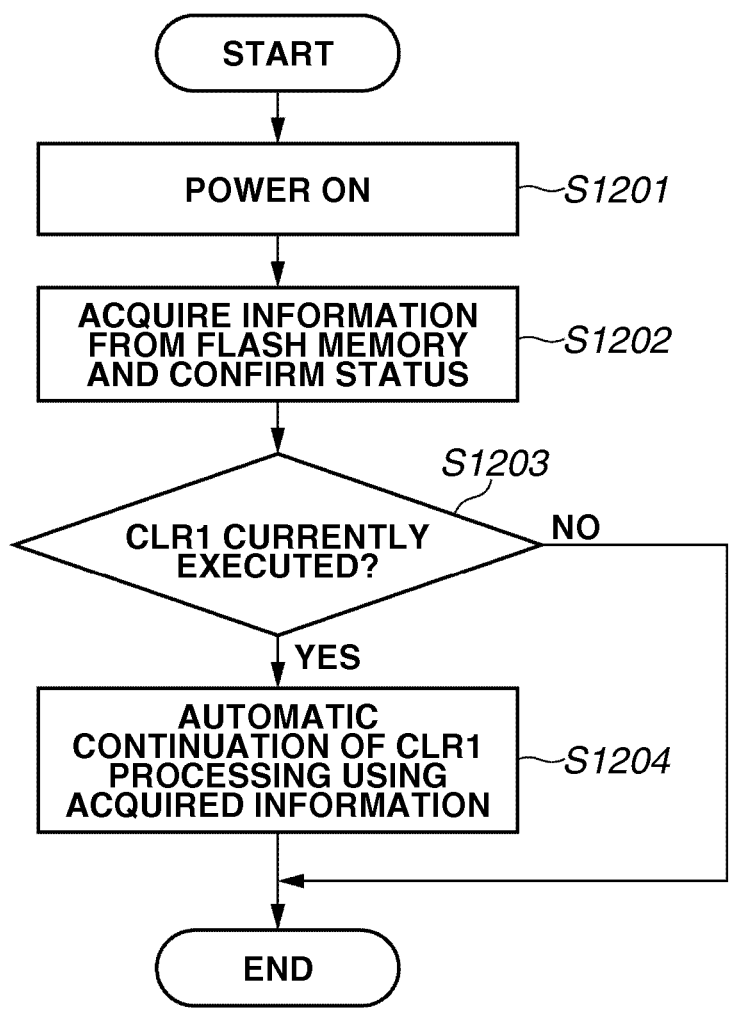
FIG. 12 is a flowchart illustrating a power ON sequence.

FIG. 12 is a flowchart illustrating processing when the power source is placed in the OFF state during CLR processing, and then subsequently is placed in the ON state. The processing in the flowchart is one of functions implemented by the CPU 301, which is configured to read a program recorded in the ROM 303 in the HDD controller 216 illustrated in FIG. 2.

In step S1201, the power source is placed in the ON state. Then in step S1202, after executing a predetermined startup sequence, the CPU 301 of the HDD controller 216 acquires the status prior to power OFF from the Flash memory (ROM 303), and executes confirmation of the status.

In step S1203, the CPU 301 of the HDD controller 216 determines whether or not CLR1 processing was executed prior to power OFF. When it is determined in the step S1203 that CLR1 processing was executed prior to power OFF (YES in step S1203), the CPU 301 of the HDD controller 216 advances the processing to step S1204.

In step S1204, the CPU 301 of the HDD controller 216 uses the acquired parameter information (sector address when stopped, overwrite-deletion conditions) to execute automatic consecutive processing of the CLR1 process after the sector address when processing was stopped. Then the processing in the flowchart is terminated.

On the other hand, when it is determined in the step S1203 that CLR1 processing was not executed prior to power OFF (NO in step S1203), the CPU 301 of the HDD controller 216 terminates processing of the flowchart at that point.

Even when CLR1 processes is being executed as described above, currently-executed CLR1 processing can be continuously executed until completion of processing after power ON by executing a predetermined power OFF/ON processing sequence.

The first exemplary embodiment described above is configured so that a CLR1 command is used for discarding an HDD apparatus, and the CLR2 command is used for deletion by a printing job unit. Furthermore, the CLR1 command is defined to output a response to the main controller immediately after receipt by the HDD controller, and a CLR2 command is defined to response after completion of the processing.

As another first exemplary embodiment, a control method will be described in which when a CLR2 command has the same definition as CLR1, in other words, a response is output from the HDD controller 216 to the Host immediately after receipt thereof to thereby enable receipt of a subsequent command.

In the CLR2 process, which is a deletion process executing during printing, when employing a mirroring configuration using two HDD apparatuses as described in FIG. 6, printing data and intermediate data stored in the same location may be overwrite-deleted at the same time using a mirroring process.

A control flow in an HDD controller according to a CLR2 process in another first exemplary embodiment will be described referring to FIG. 13.

Figure 13:
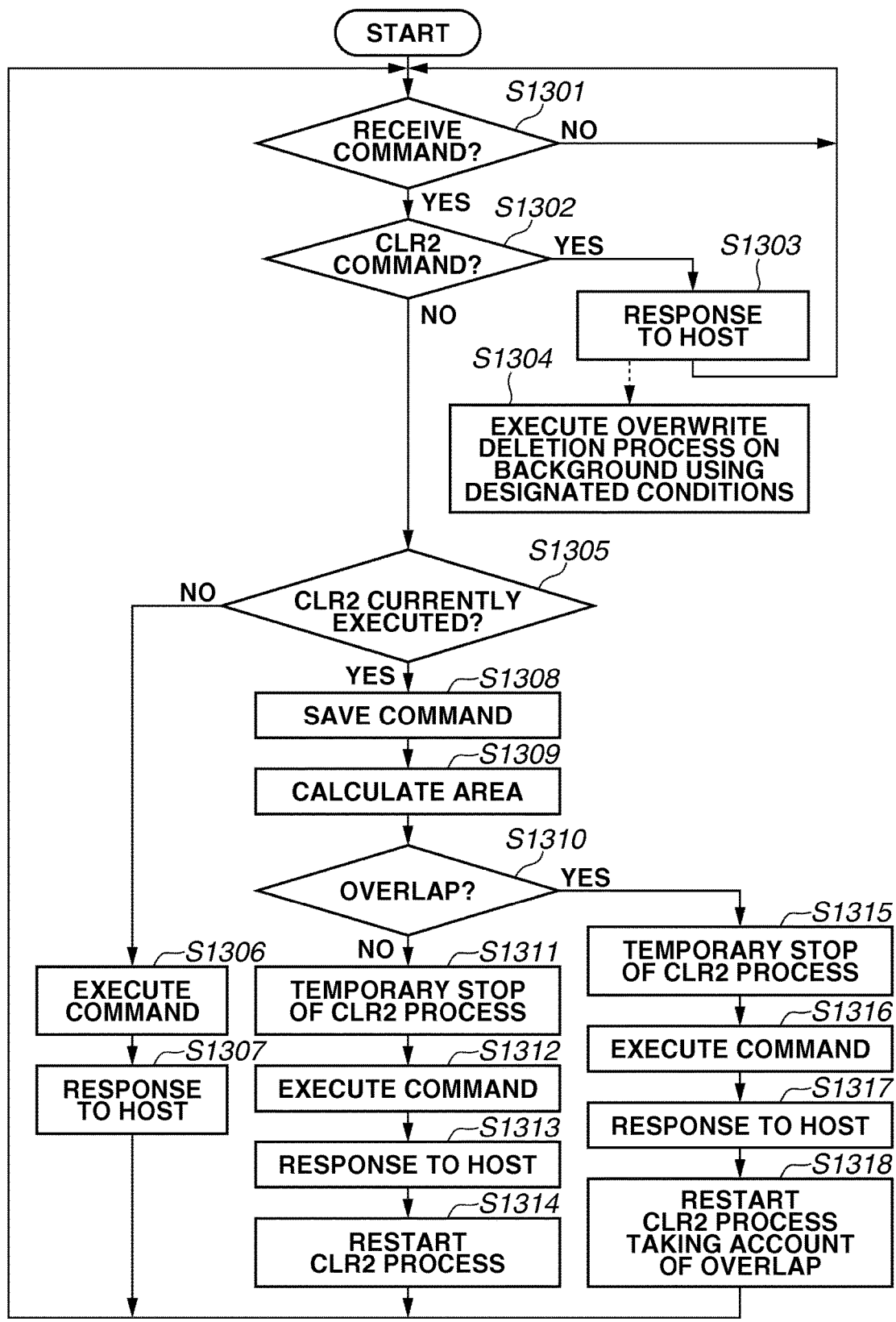
FIG. 13 is a flowchart illustrating processing of the HDD controller according to a first other exemplary embodiment.

FIG. 13 is a flowchart illustrating inner processing of the HDD controller 216 upon receipt of a standard command, a CLR1 command, or a CLR2 command from the main controller 200. The processing in the flowchart is one of functions implemented by the CPU 301, which is configured to read a program recorded in the ROM 303 in the HDD controller 216 illustrated in FIG. 2.

In step S1301, the CPU 301 of the HDD controller 216 waits for a command from the main controller 200 (NO in step S1301). When it is determined that a command is received (YES in step S1301), the process proceeds to step S1302.

In step S1302, the CPU 301 of the HDD controller 216 determines whether or not the command received in step S1301 is a CLR2 command. When it is determined that the received command is a CLR2 command (YES in step S1302), the CPU 301 of the HDD controller 216 advances the processing to step S1303.

In step S1303, the CPU 301 of the HDD controller 216 immediately responds to the Host (main controller 200). In step S1304, the CPU 301 of the HDD controller 216 uses the received attribute data to analyze the overwrite-deletion conditions, and execute background overwrite-deletion processing using the designated conditions. In order to simplify description, in FIG. 13, it is assumes that a plurality of CLR2 commands are not issued.

On the other hand, when it is determined in step S1302 that the received command is not a CLR2 command (NO in step S1302), the CPU 301 of the HDD controller 216 advances the processing to step S1305.

In step S1305, the CPU 301 of the HDD controller 216 determines whether or not CLR2 processing is currently being executed. When it is determined in step S1305 that CLR2 processing is not currently executed (NO in step S1305), the CPU 301 of the HDD controller 216 advances the processing to step S1306. In step S1306, the CPU 301 of the HDD controller executes the command received in step S1301, and then, in step S1307, outputs a response to the Host at a predetermined timing. Then the process is returned to step S1301, and waits for a subsequent command.

On the other hand, when it is determined in step S1305 that CLR2 processing is currently executed (YES in step S1305), the CPU 301 of the HDD controller 216 advances the processing to step S1308. In step S1308, the CPU 301 of the HDD controller 216 temporarily saves the received command and, then, in step S1309, an access request region by the command is calculated.

In step S1310, the CPU 301 of the HDD controller 216 compares the access request region of the received command with the CLR2 processing region, which is currently executed, to determine whether or not there is overlapping in the regions. In step S1310, when it is determined that there is no overlapping between the access request region of the received command and the CLR2 processing region that is currently executed (NO in step S1310), the CPU 301 of the HDD controller 216 advances the processing to step S1311.

In step S1311, the CPU 301 of the HDD controller 216 temporarily stops the current CLR2 processing (maintains required parameters) and then, in step S1312, performs priority execution of the received command. Then, after completion of processing of the received command, in step S1313, the CPU 301 of the HDD controller 216 responds to the Host (main controller 200) and, in step S1314, restarts the CLR2 processing that is temporarily stopped. Then, the process returns to step S1301, and waits for the next command.

On the other hand, when it is determined in step S1310 that there is overlapping between the access request region of the received command with the CLR2 processing region which is currently executed (YES in step S1310), the CPU 301 of the HDD controller 216 advances the processing to step S1315.

In step S1315, the CPU 301 of the HDD controller 216 temporarily stops the current CLR2 processing (maintains required parameters) and then, in step S1316, performs priority execution of the received command. Then, after completion of processing of the received command, in step S1317, the CPU 301 of the HDD controller 216 responds to the Host (main controller 200). To this point, the processing is the same as the processing when there is no overlapping as described above.

Then, in step S1318, the CPU 301 of the HDD controller 216 restarts CLR2 processing that is temporarily stopped by taking the calculated regions of overlapping into account. The process returns to step S1301, and waits for the next command.

Now, the restart of the CLR2 processing taking in consideration of the overlapping in step S1318 described above will be described. When the access range of the received command during CLR2 processing overlaps with the deletion range, the overlapping region, when restart the CLR2, is not be overwritten with the deletion pattern if the command for priority execution in particular is a Write process.

More specifically, the CPU 301 of the HDD controller 216 perform control using the calculation results of overlapping regions so that overlapping portions in the remaining deletion range are skipped when executing overwriting-deletion processing. On the other hand, when the command for priority execution in particular is a Read process, no consideration is to be given to the presence of overlapping.

Figure 14:
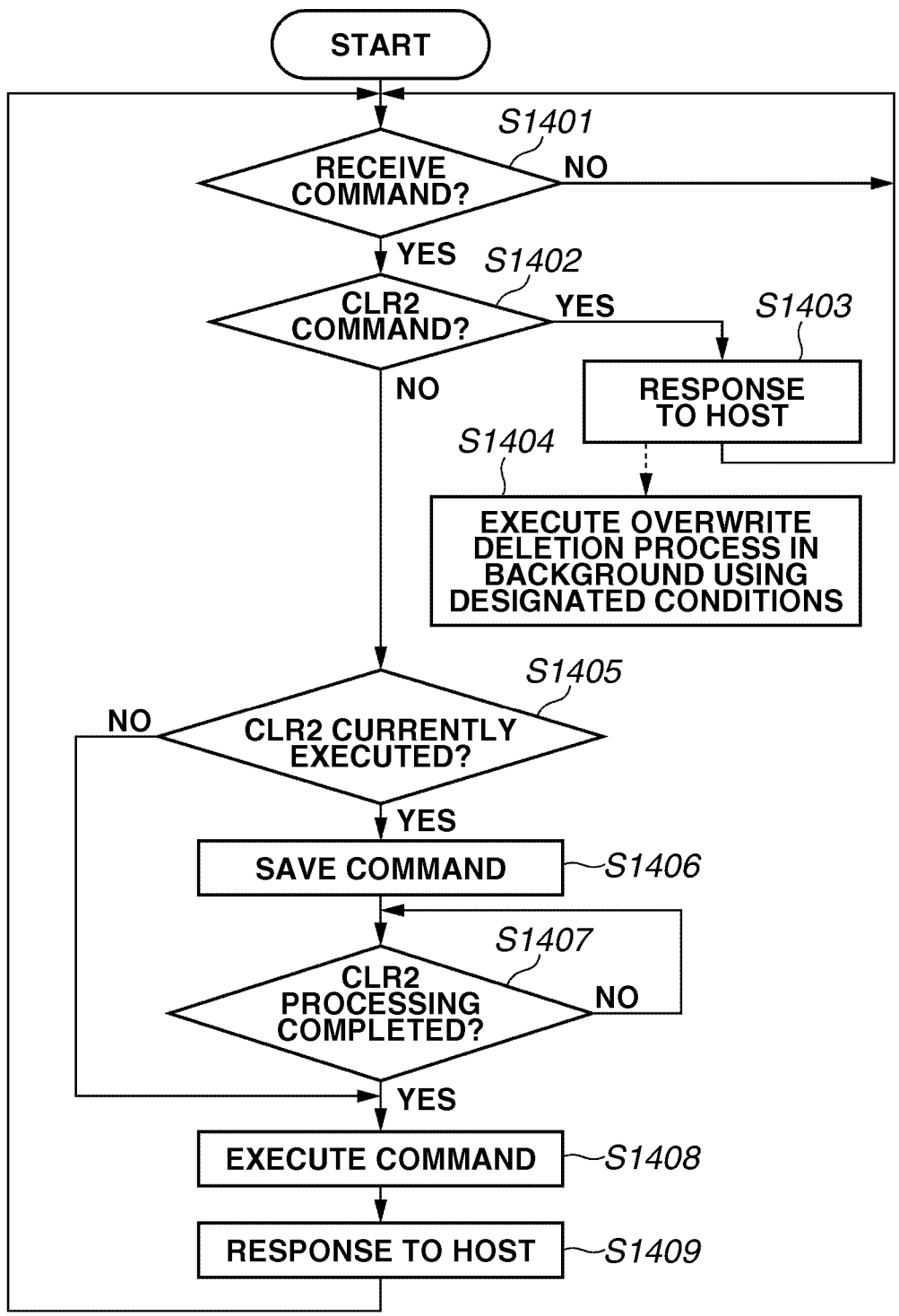
FIG. 14 is a flowchart illustrating processing of the HDD controller according to a second other exemplary embodiment.

FIG. 14 is a flowchart illustrating inner processing of the hard disk controller relating to CLR2 processing in another second exemplary embodiment.

FIG. 14 is a flowchart illustrating an inner processing of the HDD controller 216, which has received a standard command, a CLR1 command, or a CLR2 command from the main controller 200. The processing in the flowchart is one of functions implemented by the CPU 301, which is configured to read a program recorded in the ROM 303 in the HDD controller 216 illustrated in FIG. 2.

Steps S1401-S1404 are the same as steps S1301-S1304 described above, and therefore the description thereof will not be repeated. In step S1402, when the CPU 301 of the HDD controller 216 determines that the command received in step S1401 is not a CLR2 command (NO in step S1401), the CPU 301 advances the processing to step S1405.

In step S1405, the CPU 301 of the HDD controller 216 determines whether or not CLR2 processing is currently executed. When it is determined in step S1405 that CLR2 processing is not currently executed (NO in step S1405), the CPU 301 of the HDD controller 216 advances the processing to step S1408.

In step S1408, the CPU 301 of the HDD controller 216 executes the saved received command, and then after completion of processing of the received command, in step S1409, outputs a response to the Host (main controller 200). Then the process returns to step S1401, and waits for the next command.

On the other hand, when it is determined in step S1405 that CLR2 processing is currently executed (YES in step S1405), the CPU 301 of the HDD controller 216 advances the processing to step S1406. In step S1406, the CPU 301 of the HDD controller 216 temporarily stores the received command. When the received command is a Write process, the write data is also be temporarily saved.

Then in step S1407, the CPU 301 of the HDD controller 216 waits for completion of the currently executed CLR2 process (NO in step s1407). In step S1407, when it is determined that the currently executed CLR2 process has been completed (YES in step S1407), the CPU 301 of the HDD controller 216 advances the processing to step S1408, and executes the saved and received command.

After completion of processing of the received command, in step S1409, the CPU 301 of the HDD controller 216 outputs a response to the Host (main controller 200). Then, the process returns to step S1401, and waits for the next command.

As described above referring to FIG. 13 and FIG. 14, the deletion command (CLR1) for discarding an HDD apparatus and a deletion command (CLR2) executed by a printing job unit may have the same processing contents and differ only with respect to a command code for distinguishing the purpose. In other words, CLR2 illustrated in FIG. 13 and FIG. 14 may be replaced with CLR1.

In FIG. 13, when a new command is received during overwriting-deletion processing (CLR1 or CLR2) from a host apparatus such as the main controller 200, the HDD controller 216 stores the intermediate process of the overwriting-deletion process and executes priority processing of the received command. Furthermore, in FIG. 14, when a new command is received during overwriting-deletion processing from a host apparatus such as the main controller 200, the HDD controller 216 stores the received command until completion of the overwriting-deletion process.

However, the HDD controller 216 may perform control to change processing according to whether the command received during the overwriting-deletion process is a command to the object hard disk for the overwriting-deletion process.

For example, when the command received during the overwriting-deletion process is a command to the object hard disk for the overwriting-deletion process, the HDD controller 216 executes control as illustrated in FIG. 13 and FIG. 14. In other words, the HDD controller 216 stores the received command until completion of the overwriting-deletion process, or saves the progression state of the overwriting-deletion process and performs priority execution of the received command.

When the command received during the overwriting-deletion process is not a command to the object hard disk for the overwriting-deletion process, the HDD controller 216 performs control so that the processing for the received command is executed.

As described above, according to each of the exemplary embodiments, the load caused by an overwriting-deletion process on a main controller is suppressed to a minimum, and an HDD controller is constructed with a simple configuration, thereby enabling the present invention to be applied to a wide range of system configurations. Furthermore, the overwriting-deletion process enables normal access to the HDD apparatus and thus enables efficient execution of the overwriting-deletion process as an overall system.

Since power shutdown and operations after startup can be automatically processed in a continuous manner, the overwriting-deletion process can be efficiently executed as an overall system. The present invention is not limited to the various configurations of data and operational details described above, and may take a variety of configurations or operational details according to the use or purpose.

Although exemplary embodiments have been described above, the present invention may include aspects as such a system, apparatus, method, program, or storage medium. More specifically, the present invention may be applied to a system including a plurality of devices or may be applied to an apparatus formed from one device.

In each of the above exemplary embodiments, a control apparatus according to the present invention is described using an example of an HDD controller configured to control a hard disk. However, the control apparatus according to the present invention may be a control apparatus configured to control a storage apparatus other than a hard disk, and is not limited to a hard disk controller. For example, the control apparatus may control a flash memory.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:
1. An apparatus comprising:
a host apparatus;
storage devices including a first storage unit and a second storage unit; and
a memory controller which communicates with the host apparatus, wherein the memory controller comprises:
a deletion unit configured to delete data on a memory in the first or second storage device by rewriting the data to be deleted on the memory with predetermined data;
a receiving unit configured to receive a first command and a second command from the host apparatus, wherein the first command is a command to execute a first deletion process on the first storage device with the deletion unit in accordance with user's instruction, and the second command is a command to delete data corresponding to a print job in one of the storage devices with the deletion unit in response to a completion of printing processing of the print job;
a first setting unit configured to set a number of times for rewriting the data to be deleted on the memory in deletion process by the deletion unit in accordance with the first command;
a second setting unit configured to set a number of times for rewriting the data to be deleted on the memory in deletion process by the deletion unit in accordance with the second command wherein the number of times set by the first setting unit and the number of times set by the second setting unit can be different numbers and can be set individually; and
a control unit configured to execute the first deletion process in accordance with the receipt of the first command, and execute the second deletion process in accordance with the receipt of the second command,
wherein in the first deletion process, the deletion unit deletes the data designated to be deleted by the user in the first storage unit by rewriting, the number of times set by the first setting unit, the designated data,
in the second deletion process, only one or more blocks in the memory corresponding to the print job is determined and the deletion unit deletes, the number of times set by the second setting unit, the only data corresponding to the print job by rewriting the determined memory block by the deletion unit,
wherein in a case where the receiving unit receives the first command for a first storage unit, and the second deletion processing has started on a second storage unit, the control unit executes the first deletion process on the first storage unit after the second deletion processing of the second storage unit is completed, and
wherein the control unit notifies the host apparatus without waiting completion of the first deleting process and notifies the host apparatus after completion of the second deleting process.

2. The apparatus according to claim 1,
wherein attribute data including information for specifying a specific storage unit is attached to the first command and the second command, and
wherein the control unit selects the specific storage unit based on the attribute data attached to a deletion command.

3. The apparatus according to claim 2,
wherein the attribute data includes information for specifying, in units of sectors, a range of deletion according to the deletion command.

4. The apparatus according to claim 2,
wherein the attribute data includes information for specifying overwrite data.

5. The apparatus according to claim 2,
wherein the attribute data includes information for specifying an overwrite number of times by overwrite data.

6. The apparatus according to claim 1, wherein the control unit is configured to store information indicating progression state of sending of overwrite data in a non-volatile storage unit in a case where the receiving unit receives a command for cutting off power supply to a specific storage unit during sending of the overwrite data to the specific storage apparatus, and to restart sending of the overwrite data based on the information indicating progression state of sending of the overwrite data stored in the non-volatile storage unit in a case where the specific storage apparatus is activated.

7. The apparatus according to claim 1,
wherein the first command is a command for deleting data at a timing that a storage unit having the memory is discarded.

8. A method comprising:
deleting data on a memory by rewriting the data to be deleted on the memory with predetermined data;
receiving a first command and a second command from a host apparatus, wherein the first command is a command to execute a first deletion process on a first storage device with the deleting in accordance with user's instruction, and the second command is a command to delete data corresponding to a print job in one of the first storage unit and a second storage unit with the deleting in response to a completion of printing processing of the print job;
first setting sets a number of times for rewriting the data to be deleted on the memory in deletion process by the deleting in accordance with the first command;
second setting sets a number of times for rewriting the data to be deleted on the memory in deletion process by the deleting in accordance with the second command,
wherein the number of times set by the first setting and the number of times set by the second setting can be different numbers and can be set individually; and
executing, the first deletion process in accordance with the receipt of the first command, and executing the second deletion process in accordance with the receipt of the second command;
executing, in a case where the receiving receives the first command for a first storage unit, and the second deletion processing has started on a second storage unit, the first deletion process on the first storage unit after the second deletion processing of the second storage unit is completed; and
notifying the host apparatus without waiting completion of the first deleting process and notifying the host apparatus after completion of the second deleting process,
wherein in the second deletion process, only one or more sectors in the memory corresponding to the print job is determined and the deleting deletes the data corresponding to the print job by rewriting the only determined memory blocky.

9. The method according to claim 8,
wherein attribute data including information for specifying a specific storage unit is attached to the first command and the second command, and
wherein the specific storage unit is selected based on the attribute data attached to a deletion command.

10. The method according to claim 9,
wherein the attribute data includes information for specifying, in units of sectors, a range of deletion according to the deletion command.

11. The method according to claim 9,
wherein the attribute data includes information for specifying overwrite data.

12. The method according to claim 9,
wherein the attribute data includes information for specifying an overwrite number of times by overwrite data.

13. The method according to claim 8, further comprising:
storing information indicating progression state of sending of overwrite data in a non-volatile storage unit in a case where the receiving receives a command for cutting off power supply to a specific storage unit during sending of the overwrite data to the specific storage apparatus; and restarting sending of the overwrite data based on the information indicating progression state of sending of the overwrite data stored in the non-volatile storage unit in a case where the specific storage apparatus is activated.

14. The method according to claim 8, wherein the first command is a command for deleting data at a timing that the storage unit having the memory is discarded.

15. A non-transitory computer readable medium storing a computer-executable program of instructions for causing a computer to perform a method comprising:
deleting data on a memory by rewriting the data to be deleted on the memory with predetermined data;
receiving a first command and a second command from a host apparatus, wherein the first command is a command to execute a first deletion process on a first storage device with the deleting in accordance with user's instruction, and the second command is a command to delete data corresponding to a print job in one of the first storage unit and a second storage unit with the deleting in response to a completion of printing processing of the print job;
first setting sets a number of times for rewriting the data to be deleted on the memory in deletion process by the deletion unit in accordance with the first command;
a second setting sets a number of times for rewriting the data to be deleted on the memory in deletion process by the deleting in accordance with the second command wherein the number of times set by the first setting and the number of times set by the second setting can be different numbers and can be set individually;
executing, the first deletion process in accordance with the receipt of the first command, and executing the second deletion process in accordance with the receipt of the second command;
executing, in a case where the receiving receives the first command for a first storage unit, and the second deletion processing has started on a second storage unit, the first deletion process on the first storage unit after the second deletion processing of the second storage unit is completed; and
notifying the host apparatus without waiting completion of the first deleting process and notifying the host apparatus after completion of the second deleting process,
wherein in the second deletion process, only one or more sectors in the memory corresponding to the print job is determined and the deleting deletes the only data corresponding to the print job by rewriting the determined memory block.

16. An apparatus comprising:
a host apparatus;
storage devices; and
a memory controller which communicates with the host apparatus, wherein the memory controller comprises:
a deletion unit configured to delete data on a memory by rewriting the data to be deleted with predetermined data;
a receiving unit configured to receive a first command and a second command from the host apparatus, wherein the first command is a command to execute a first deletion process on one of the storage devices with the deletion unit in accordance with user's instruction, and the second command is a command to delete data corresponding to a print job in one of the storage devices with the deletion unit in response to a completion of printing processing of the print job;
a first setting unit configured to set a number of times for rewriting the data to be deleted on the memory in deletion process by the deletion unit in accordance with the first command;
a second setting unit configured to set a number of times for rewriting the data to be deleted on the memory in deletion process by the deletion unit in accordance with the second command wherein the number of times set by the first setting unit and the number of times set by the second setting unit can be different numbers and can be set individually; and
a control unit configured to, execute the first deletion process in accordance with the receipt of the first command, and execute the second deletion process in accordance with the receipt of the second command,
wherein in the first deletion process, the deletion unit deletes the data designated by the user to be deleted in the one of the storage devices by rewriting the one of the storage devices with the deleting unit,
in the second deletion process, only one or more blocks in the memory corresponding to the print job is determined and the deletion unit deletes the data corresponding to the print job by rewriting the only determined memory block with the deletion unit, and
wherein the control unit notifies the host apparatus for allowing the host apparatus processing another incoming command without waiting completion of the first deleting process, and notifies the host apparatus for allowing the host apparatus processing another incoming command after completion of the second deleting process.

* * * * *